(12) United States Patent
Kobata et al.

(10) Patent No.: US 8,409,721 B2
(45) Date of Patent: Apr. 2, 2013

(54) PRODUCTION METHOD OF PIGMENT-DISPERSING RESIN

(75) Inventors: Masami Kobata, Hiratsuka (JP);
Noriyuki Yamada, Hiratsuka (JP);
Hiromi Harakawa, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 1378 days.

(21) Appl. No.: 12/081,977

(22) Filed: Apr. 24, 2008

(65) Prior Publication Data
US 2008/0268269 A1  Oct. 30, 2008

(30) Foreign Application Priority Data

Apr. 24, 2007 (JP) ................................. 2007-114890

(51) Int. Cl.
*B32B 27/28* (2006.01)
*B05D 3/02* (2006.01)
*C08G 75/02* (2006.01)
*C08L 85/02* (2006.01)

(52) U.S. Cl. ........ 428/500; 526/278; 526/287; 524/609; 524/610; 427/385.5

(58) Field of Classification Search ........................ None
See application file for complete search history.

(56) References Cited

U.S. PATENT DOCUMENTS

2003/0236324 A1* 12/2003 Yukawa et al. ................. 524/88

FOREIGN PATENT DOCUMENTS

| EP | 1 348 724 | 10/2003 |
|---|---|---|
| JP | 6-211944 | 8/1994 |
| JP | 2001-2736 | 1/2001 |
| JP | 2001-279164 | 10/2001 |
| WO | 2008/044583 | 4/2008 |

* cited by examiner

*Primary Examiner* — John J Figueroa
(74) *Attorney, Agent, or Firm* — Wenderoth, Lind & Ponack, L.L.P.

(57) ABSTRACT

This invention provides a method for producing a pigment-dispersing resin which contains divalent group(s) represented by a general formula (I):

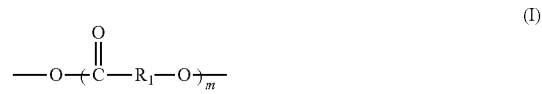

(in which $R_1$ stands for $C_{1-10}$ alkylene group, m is an integer of 1-30, and the m recurring units,

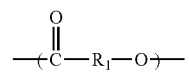

may be the same or different),
phosphoric acid group(s) and/or sulfonic acid group(s), characterized by copolymerizing a polymerizable unsaturated monomeric mixture in a reaction solvent containing at least 30 mass %, based on the total mass of the reaction solvent, of an organic solvent having no hydroxyl group and having a solubility in 20° C. water of at least 100 mass %.

13 Claims, No Drawings

PRODUCTION METHOD OF PIGMENT-DISPERSING RESIN

TECHNICAL FIELD

This invention relates to a novel production method of pigment-dispersing resin.

BACKGROUND ART

Organic pigment and/or inorganic pigment are widely used in paint, ink and the like in general, for such purposes as favorable appearance, light-shading, rust-proofing and the like. When these pigments are used in paint, however, in occasions the pigments fail to be uniformly dispersed in the paint to invite inferior appearance or water resistance of the resulting coating film of the paint, which has been a problem requiring a solution.

For example, JP Hei 6 (1994)-211944A discloses that a pigment-dispersing resin formed of a copolymer (A) of (meth)acrylate having $C_{1-4}$ alkyl group, (meth)acrylate having $C_{6-30}$ alkyl group and polymerizable monomer having a specific structure, excels in pigment-dispersing ability of various pigments and exhibits good compatibility with various resins used for paints, while being free of such problem as weatherability. However, when the pigment-dispersing resin is used in paint, coating film formed therefrom may show inferior water resistance.

JP 2001-2736A discloses that the use of a pigment-dispersing acrylic resin having a weight-average molecular weight within a range of 10,000-100,000, which is obtained by copolymerization of a monomeric mixture comprising a polymerizable unsaturated monomer containing at least one of hydrophilic functional group selected from amino group, quaternary ammonium salt group and sulfonic acid group; hydroxyl-containing polymerizable unsaturated monomer; (meth)acrylic acid ester monomer of a specific structure having $C_{8-24}$ branched alkyl group; and other polymerizable unsaturated monomer can provide a pigment-dispersing paste composition of which pigment-dispersibility, let down stability and the like are drastically improved. When the pigment-dispersing resin is used in paint, however, resulting coating film may exhibit inferior water resistance.

DISCLOSURE OF THE INVENTION

The object of the present invention is to provide a pigment-dispersing resin which is capable of forming coating film having excellent appearance and water resistance.

We have engaged in concentrative studies with the view to accomplish the above object, to now discover that a pigment-dispersing resin capable of forming coating film having excellent appearance and water resistance could be obtained by copolymerizing a mixture of specific polymerizable unsaturated monomers in a specific reaction solvent, and completed the present invention.

Thus, the present invention provides a production method of a pigment-dispersing resin (A) containing divalent group(s) represented by the following general formula (I):

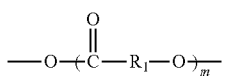
(I)

(in which $R_1$ stands for $C_{1-10}$ alkylene group, m is an integer of 1-30, and the m recurring units,

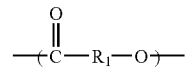

may be the same or different), phosphoric acid group(s) and/or sulfonic acid group(s), characterized by copolymerizing a polymerizable unsaturated monomeric mixture (a) which is selected from the following polymerizable unsaturated monomeric mixtures (a-1) to (a-4):

polymerizable unsaturated monomeric mixture (a-1): a mixture of polymerizable unsaturated monomer(s) (m-1) having a divalent group represented by the above general formula (I), phosphoric acid group-containing polymerizable unsaturated monomer(s) (m-2), and polymerizable unsaturated monomer(s) (m-3) other than those polymerizable unsaturated monomers (m-1) and (m-2);

polymerizable unsaturated monomeric mixture (a-2): a mixture of polymerizable unsaturated monomer(s) (m-1) having a divalent group represented by the above general formula (I), sulfonic acid group-containing polymerizable unsaturated monomer(s) (m-4), and polymerizable unsaturated monomer(s) (m-5) other than those polymerizable unsaturated monomers (m-1) and (m-4);

polymerizable unsaturated monomeric mixture (a-3): a mixture of polymerizable unsaturated monomer(s) (m-6) having the divalent group represented by the above general formula (I) and phosphoric acid group, and polymerizable unsaturated monomer(s) (m-7) other than the polymerizable unsaturated monomer(s) (m-6); and polymerizable unsaturated monomeric mixture (a-4): a mixture of polymerizable unsaturated monomer(s) (m-8) having the divalent group represented by the above general formula (I) and sulfonic acid group, and polymerizable unsaturated monomer(s) (m-9) other than the polymerizable unsaturated monomer(s) (m-8); in a reaction solvent (b) which comprises at least 30 mass %, based on the total mass of the reaction solvent, of an organic solvent (b-1) having no hydroxyl group and having a solubility in 20° C. water of at least 100 mass %.

The pigment-dispersing resin (A) of the present invention can provide, when it is used in pigment-containing paint, paint which forms coating film having excellent appearance and water resistance.

Hereinafter the production method of the pigment-dispersing resin (A) of the invention is explained in further details.

Polymerizable Unsaturated Monomeric Mixture (a-1)

Polymerizable unsaturated monomeric mixture (a-1) is a mixture of the following polymerizable unsaturated monomer (m-1), phosphoric acid group-containing polymerizable unsaturated monomer (m-2), and polymerizable unsaturated monomer (m-3) other than those polymerizable unsaturated monomers (m-1) and (m-2).

Polymerizable Unsaturated Monomer (m-1)

Polymerizable unsaturated monomer (m-1) is a polymerizable unsaturated monomer containing a divalent group represented by the following general formula (I):

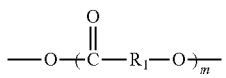

(I)

(in which $R_1$ stands for $C_{1-10}$ alkylene group, m is an integer of 1-30, and the m recurring units,

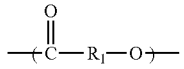

may be the same or different)

which can be synthesized by, for example, ring-opening addition of cyclic ester compound to hydroxyl group of hydroxyl-containing unsaturated monomer such as hydroxyl-containing (meth)acrylates, hydroxyl-containing (meth)acrylamides, by the means known per se.

Examples of above hydroxyl-containing (meth)acrylates include hydroxyalkyl (meth)acrylate such as 2-hydroxyethyl (meth)acrylate and 2- or 3-hydroxylpropyl (meth)acrylate; and examples of hydroxyl-containing (meth)acrylamides include hydroxyalkyl (meth)acrylamide such as 2-hydroxyethyl (meth)acrylamide and 2- or 3-hydroxypropyl (meth)acrylamide.

As examples of the cyclic ester compound, $C_{3-11}$ lactones such as β-propiolactone, dimethylpropiolactone, γ-butyrolactone, γ-valerolactone, δ-valerolactone, γ-caprolactone, δ-caprolactone, ε-caprolactone, γ-caprylolactone and δ-laurolactone can be named, which can be used each alone or in combination of two or more. Use of ε-caprolactone is particularly preferred.

As the polymerizable unsaturated monomer (m-1), such polymerizable unsaturated monomers as those obtained by ring-opening addition of, for example, ε-caprolactone to 2-hydroxyethyl (meth)acrylate or 2-hydroxyethyl (meth)acrylamide, can also be used. It is particularly preferred to use a polymerizable unsaturated monomer obtained by ring-opening addition of ε-caprolactone to 2-hydroxyethyl (meth)acrylate. Incidentally, in the present specification "(meth)acrylate" means "acrylate or methacrylate", "(meth)acrylic acid" means "acrylic acid or methacrylic acid", "(meth)acryloyl" means "acryloyl or methacryloyl", and "(meth)acrylamide" means "acrylamide or methacrylamide".

As the polymerizable unsaturated monomer (m-1), those available on the market may be used, for example, PLACCEL FM1 (1 mol-ε-caprolactone-added 2-hydroxyethyl methacrylate), PLACCEL FM-2 (2-mol-ε-caprolactone-added 2-hydroxyethyl methacrylate), PLACCEL FM-3 (3-mol-ε-caprolactone-added 2-hydroxyethyl methacrylate), PLACCEL FM-5 (5-mol-ε-caprolactone-added 2-hydroxyethyl methacrylate), PLACCEL FA1 (1 mol-ε-caprolactone-added 2-hydroxyethyl acrylate), PLACCEL FA-2 (2 mol-ε-caprolactone-added 2-hydroxyethyl acrylate), PLACCEL FA-3 (3 mol-ε-caprolactone-added 2-hydroxyethyl acrylate), PLACCEL FA5 (5 mol-ε-caprolactone-added 2-hydroxyethyl acrylate), PLACCEL FA10 (10 mol-ε-caprolactone-added 2-hydroxyethyl acrylate) and the like.

Above polymerizable unsaturated monomers (m-1) can be used either alone or in combination of two or more.

Phosphoric Acid Group-containing, Polymerizable Unsaturated Monomer (m-2)

Phosphoric acid group-containing, polymerizable unsaturated monomer (m-2) is a compound which contains at least one each of the phosphoric acid group represented by the following general formula (II):

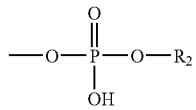

(II)

(in which $R_2$ stands for hydrogen atom or a $C_{1-20}$, in particular, $C_{1-8}$, hydrocarbon group; preferably hydrogen atom)

and polymerizable unsaturated bond, per molecule.

As the $C_{1-20}$ hydrocarbon groups, for example, straight or branched chain alkyl groups such as butyl, isobutyl, sec-butyl, tert-butyl, pentyl, isopentyl, hexyl, octyl, 2-ethylhexyl, decyl and isodecyl; and phenyl groups can be named.

Examples of the phosphoric acid group-containing, polymerizable unsaturated monomer (m-2) include acid phosphoxyalkyl (meth)acrylate such as acid phosphoxyethyl (meth)acrylate, acid phosphoxypropyl (meth)acrylate, acid phosphoxybutyl (meth)acrylate, acid phosphoxyhexyl (meth)acrylate and acid phosphoxydecyl (meth)acrylate; acid phosphoxypolyoxyalkylene glycol mono(meth)acrylate such as acid phosphoxypolyoxyethylene glycol mono(meth)acrylate and acid phosphoxypolyoxypropylene glycol mono (meth)acrylate; polymerizable unsaturated monomers obtained by adding glycidyl (meth)acrylate to monoalkylphosphoric acid such as monobutylphosphoric acid, monodecylphosphoric acid, monolaurylphosphoric acid and monosterarylphosphoric acid; and polymerizable unsaturated monomers obtained by adding glycidyl (meth)acrylate to benzylphosphoric acid.

As the polymerizable unsaturated monomer (m-2), those available on the market can be used, for example, KAYAMER PM-2 of Nippon Kayaku Co., Ltd.; Light Ester P-1M of Kyoeisha Chemical Co., Ltd.; Phosmer M, Phosmer CL, Phosmer PE and Phosmer PP of Uni-Chemical Co., Ltd.

The above polymerizable unsaturated monomers (m-2) may be used alone or in combination of two or more.

Polymerizable Unsaturated Monomer (m-3) other than the Polymerizable Unsaturated Monomers (m-1) and (m-2)

Polymerizable unsaturated monomer (m-3) include polymerizable unsaturated monomers other than the above polymerizable unsaturated monomer (m-1) and phosphoric acid group-containing, polymerizable unsaturated monomer (m-2), examples of which are: alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (tradename, Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and tricyclodecanyl (meth)acrylate; polymerizable unsaturated monomers having isobornyl group, such as isobornyl (meth)acrylate; polymerizable unsaturated monomers having adamantyl group, such as adamantyl (meth)acrylate; polymerizable unsaturated monomers having tricyclodecanyl group, such as tricyclodecanyl (meth)acrylate; vinyl aromatic compounds such as styrene, α-methylstyrene and vinyltoluene; polymerizable unsaturated monomers having alkoxysilyl group, such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers having fluorinated alkyl group such as fluoroolefin; polymerizable unsaturated monomers having photo-polymerizable functional group like maleimido group; vinyl compounds such as N-vinylpyrrolidone, ethylene, butadiene, chloroprene, vinyl propionate and vinyl acetate; monoesterified products of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth)acrylate; hydroxyl-containing polymerizable unsaturated monomers such as N-hydroxymethyl (meth)acrylamide, allyl alcohol and (meth)acrylate having hydroxyl-terminated polyoxyethylene chain; carboxyl-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-dimethylaminopropyl (meth)acrylamide and addition products of glycidyl (meth)acrylate with amines; polymerizable unsaturated monomers having at least two polymerizable unsaturated groups per molecule, such as allyl (meth)acrylate and 1,6-hexanediol di(meth)acrylate; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allylglycidyl ether; (meth)acrylates having alkoxy-terminated polyoxyethylene chain; sulfonic acid group-containing polymerizable unsaturated monomers such as 2-acrylamido-2-methylpropanesulfonic acid, 2-sulfoethyl (meth)acrylate, allylsulfonic acid, 4-styrenesulfonic acid, and sodium salts or ammonium salts of the foregoing; polymerizable unsaturated monomers having UV absorbing functional group, such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy) benzophenone and 2-(2'-hydroxy-5'-methacryloyloxyethylphenyl)-2H-benzotriazole; UV-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine; and carbonyl-containing polymerizable unsaturated monomer compounds such as acrolein, diacetoneacrylamide, diacetonmethacrylamide, acetoacetoxyethyl methacrylate, formylstyrol and $C_{4-7}$ vinylalkylketones (e.g., vinyl methyl ketone, vinyl ethyl ketone, vinyl butyl ketone). These can be used either alone or in combination of two or more.

It is preferred for the polymerizable unsaturated monomer (m-3), from the viewpoint of water resistance of the resulting coating film, to contain at least one of the polymerizable unsaturated monomer selected from the group consisting of above vinyl aromatic compounds, polymerizable unsaturated monomers having $C_{6-18}$ alkyl groups and polymerizable unsaturated monomers having $C_{6-18}$ cycloalkyl groups, among which styrene being particularly preferred.

As examples of the polymerizable unsaturated monomers having $C_{6-18}$ alkyl groups, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate and "isostearyl acrylate" (tradename, Osaka Organic Chemical Industry Ltd.) can be named, which may be used either alone or in combination of two or more. Of these, use of polymerizable unsaturated monomers having $C_{8-13}$ alkyl groups, in particular, 2-ethylhexyl (meth)acrylate and/or lauryl (meth)acrylate, is preferred.

As examples of the polymerizable unsaturated monomers having $C_{6-18}$ cycloalkyl groups, cyclohexyl (meth)acrylate, methylcyclohexyl (meth)acrylate, t-butylcyclohexyl (meth)acrylate, cyclododecyl (meth)acrylate, isobornyl (meth)acrylate, adamantyl (meth)acrylate and tricyclodecanyl (meth)acrylate can be named, which may be used either alone or in combination of two or more. Of these, use of polymerizable unsaturated monomers having $C_{8-13}$ cycloalkyl groups, in particular, cyclohexyl (meth)acrylate, is preferred.

Where the polymerizable unsaturated monomer (m-3) contains at least one of the polymerizable unsaturated monomer selected from the group consisting of above vinyl aromatic compounds, polymerizable unsaturated monomers having $C_{6-18}$ alkyl groups and polymerizable unsaturated monomers having $C_{6-18}$ cycloalkyl groups, the combined use amount of the vinyl aromatic compound, polymerizable unsaturated monomer having $C_{6-18}$ alkyl group and polymerizable unsaturated monomer having $C_{6-18}$ cycloalkyl group is preferably within a range of generally 1-96 mass %, in particular, 10-70 mass %, inter alia, 20-60 mass %, based on the total amount of the polymerizable unsaturated monomers (m-1) to (m-3).

Also where the polymerizable unsaturated monomer (m-3) contains styrene, the use amount of styrene is preferably within a range of generally 5-70 mass %, in particular, 10-60 mass %, inter alia, 15-50 mass %, based on the total amount of the polymerizable unsaturated monomers (m-1) to (m-3).

While the mixing ratios of those polymerizable unsaturated monomers (m-1) to (m-3) in the polymerizable unsaturated monomeric mixture (a-1) are not strictly limited, generally they can be within the following ranges, based on the total amount of the polymerizable unsaturated monomers (m-1) to (m-3):

polymerizable unsaturated monomer (m-1):
  2-90 mass %, preferably 5-70 mass %, inter alia, 10-60 mass %,
polymerizable unsaturated monomer (m-2):
  2-90 mass %, preferably 5-80 mass %, inter alia, 10-70 mass %,
polymerizable unsaturated monomer (m-3):
  1-96 mass %, preferably 10-90 mass %, inter alia, 20-80 mass %, Polymerizable Unsaturated Monomeric Mixture (a-2)

Polymerizable unsaturated monomeric mixture (a-2) is a mixture of aforesaid polymerizable unsaturated monomer (m-1), sulfonic acid group-containing polymerizable unsaturated monomer (m-4), and polymerizable unsaturated monomer (m-5) other than the polymerizable unsaturated monomers (m-1) and (m-4).

Sulfonic Acid Group-containing Polymerizable Unsaturated Monomer (m-4)

Sulfonic acid group-containing polymerizable unsaturated monomer (m-4) is a compound having at least one each of sulfonic acid group and polymerizable unsaturated bond per molecule, examples of which including 2-acrylamido-2-methylpropanesulfonic acid and 2-sulfoethyl (meth)acrylate. These monomers can be used either alone or in combination of two or more.

Polymerizable Unsaturated Monomer (m-5) other than the Polymerizable Unsaturated Monomers (m-1) and (m-4)

Polymerizable unsaturated monomers (m-5) are polymerizable unsaturated monomers other than the polymerizable unsaturated monomers (m-1) and sulfonic acid group-containing polymerizable unsaturated monomers (m-4), examples of which including: alkyl or cycloalkyl (meth)acrylate such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth) acrylate, lauryl (meth)acrylate, stearyl (meth)acrylate, "isostearyl acrylate" (tradename, Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and tricyclodecanyl (meth) acrylate; polymerizable unsaturated monomers having isobornyl group, such as isobornyl (meth)acrylate; polymerizable unsaturated monomers having adamantyl group, such as adamantyl (meth)acrylate; polymerizable unsaturated monomers having tricyclodecanyl group, such as tricyclodecanyl (meth)acrylate; vinyl aromatic compounds such as styrene, α-methylstyrene and vinyltoluene; polymerizable unsaturated monomers having alkoxysilyl group, such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers having fluorinated alkyl group such as fluoroolefin; polymerizable unsaturated monomers having photo-polymerizable functional group like maleimido group; vinyl compounds such as N-vinylpyrrolidone, ethylene, butadiene, chloroprene, vinyl propionate and vinyl acetate; monoesterified products of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth) acrylate; hydroxyl-containing polymerizable unsaturated monomers such as N-hydroxymethyl (meth)acrylamide, allyl alcohol and (meth)acrylate having hydroxyl-terminated polyoxyethylene chain; carboxyl-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-dimethylaminopropyl (meth)acrylamide and addition products of glycidyl (meth)acrylate with amines; polymerizable unsaturated monomers having at least two polymerizable unsaturated groups per molecule, such as allyl (meth)acrylate and 1,6-hexanediol di(meth)acrylate; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allylglycidyl ether; (meth)acrylates having alkoxy-terminated polyoxyethylene chain; phosphoric acid group-containing polymerizable unsaturated monomers such as acid phosphoxyethyl (meth)acrylate, acid phosphoxypolyoxyethylene glycol mono(meth)acrylate and acid phosphoxypolyoxypropylene glycol mono(meth)acrylate; polymerizable unsaturated monomers having UV absorbing functional group, such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone and 2-(2'-hydroxy-5'-methacryloyloxyethylphenyl)-2H-benzotriazole; UV-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine; and carbonyl-containing polymerizable unsaturated monomer compounds such as acrolein, diacetoneacrylamide, diacetonmethacrylamide, acetoacetoxyethyl methacrylate, formylstyrol and $C_{4-7}$ vinylalkylketones (e.g., vinyl methyl ketone, vinyl ethyl ketone, vinyl butyl ketone). These can be used either alone or in combination of two or more.

It is particularly preferred for the polymerizable unsaturated monomer (m-5), from the viewpoint of water resistance of the resulting coating film, to contain at least one of the polymerizable unsaturated monomer selected from the group consisting of above vinyl aromatic compounds, polymerizable unsaturated monomers having $C_{6-18}$ alkyl groups and polymerizable unsaturated monomers having $C_{6-18}$ cycloalkyl groups, among which styrene being particularly preferred.

As examples of the polymerizable unsaturated monomers having $C_{6-18}$ alkyl groups, n-hexyl (meth)acrylate, n-octyl (meth)acrylate, 2-ethylhexyl (meth)acrylate, nonyl (meth) acrylate, tridecyl (meth)acrylate, lauryl (meth)acrylate, stearyl (meth)acrylate and "isostearyl acrylate" (tradename, Osaka Organic Chemical Industry Ltd.) can be named, which may be used either alone or in combination of two or more. Of these, use of polymerizable unsaturated monomers having $C_{8-13}$ alkyl groups, in particular, 2-ethylhexyl (meth)acrylate and/or lauryl (meth)acrylate, is preferred.

As examples of the polymerizable unsaturated monomers having $C_{6-18}$ cycloalkyl groups, cyclohexyl (meth)acrylate, methylcyclohexyl (meth)acrylate, t-butylcyclohexyl (meth) acrylate, cyclododecyl (meth)acrylate, isobornyl (meth)acrylate, adamantyl (meth)acrylate and tricyclodecanyl (meth) acrylate can be named, which may be used either alone or in combination of two or more. Of these, use of polymerizable unsaturated monomers having $C_{8-13}$ cycloalkyl groups, in particular, cyclohexyl (meth)acrylate, is preferred.

Where the polymerizable unsaturated monomer (m-5) contains at least one of the polymerizable unsaturated monomer selected from the group consisting of above vinyl aromatic compounds, polymerizable unsaturated monomers having $C_{6-18}$ alkyl groups and polymerizable unsaturated monomers having $C_{6-18}$ cycloalkyl groups, the combined use amount of the vinyl aromatic compound, polymerizable unsaturated monomer having $C_{6-18}$ alkyl group and polymerizable unsaturated monomer having $C_{6-18}$ cycloalkyl group is preferably within a range of generally 1-96 mass %, in particular, 10-70 mass %, inter alia, 20-60 mass %, based on the total amount of the polymerizable unsaturated monomers (m-1), (m-4) and (m-5).

Also where the polymerizable unsaturated monomer (m-5) contains styrene, the use amount of styrene is preferably within a range of generally 5-70 mass %, in particular, 10-60 mass %, inter alia, 15-50 mass %, based on the total amount of the polymerizable unsaturated monomers (m-1), (m-4) and (m-5).

While the mixing ratios of those polymerizable unsaturated monomers (m-1), (m-4) and (m-5) in the polymerizable unsaturated monomeric mixture (a-2) are not strictly limited, generally they can be within the following ranges, based on the total amount of the polymerizable unsaturated monomers (m-1), (m-4) and (m-5):

polymerizable unsaturated monomer (m-1):
2-90 mass %, preferably 5-70 mass %, inter alia, 10-60 mass %, polymerizable unsaturated monomer (m-4):
2-60 mass %, preferably 5-50 mass %, inter alia, 10-40 mass %, polymerizable unsaturated monomer (m-5):
1-96 mass %, preferably 10-90 mass %, inter alia, 20-80 mass %, Polymerizable Unsaturated Monomeric Mixture (a-3)

Polymerizable unsaturated monomeric mixture (a-3) is a mixture of the following polymerizable unsaturated monomer (m-6) and polymerizable unsaturated monomer (m-7) other than the polymerizable unsaturated polymer (m-6).

Polymerizable Unsaturated Monomer (m-6)

Polymerizable unsaturated monomer (m-6) is a compound having at least one each of divalent group represented by the following general formula (I):

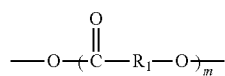

(in which $R_1$ stands for $C_{1-10}$, preferably $C_{2-6}$, alkylene group, m is an integer of 1-30, preferably 1-20, inter alia, 1-10 and the m recurring units,

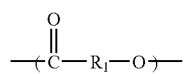

may be the same or different), phosphoric acid group represented by the following general formula (II):

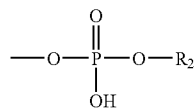

(in which $R_2$ stands for hydrogen atom or a $C_{1-20}$, in particular, $C_{1-8}$ hydrocarbon group; preferably hydrogen atom)
and polymerizable unsaturated bond, per molecule.

The polymerizable unsaturated monomer (m-6) can be readily synthesized by, for example, modifying hydroxyl-containing (meth)acrylates with cyclic ester, acting thereon a phosphorylation agent and thereafter hydrolyzing the product, according to the customarily practiced method.

As the hydroxyl-containing (meth)acrylates, for example, 2-hydroxyethyl (meth)acrylate and 2- or 3-hydroxypropyl (meth)acrylate can be named.

As the cyclic ester, for example, $C_{3-11}$ lactones such as β-propiolactone, dimethylpropiolactone, γ-butyrolactone, γ-valerolactone, δ-valerolactone, γ-caprolactone, δ-caprolactone, ε-caprolactone, γ-caprylolactone and δ-laurolactone can be named, which may be used either alone or in combination of two or more. Of these, ε-caprolactone is preferred.

As the phosphorylation agent, those known per se, for example, phosphorus pentoxide, phosphorus oxychloride, polyphosphoric acid and the like can be used.

Modification of hydroxyl-containing (meth)acrylates with cyclic ester can be effected by, for example, ring-opening addition of the cyclic ester to hydroxyl groups in the hydroxyl-containing (meth)acrylates, by a method known per se. After reacting a phosphorylation agent with, for example, terminal hydroxyl group in the resulting modification product, the phosphorylated product is hydrolyzed to provide the polymerizable unsaturated monomer (m-6).

Polymerizable unsaturated monomer (m-6) can further contain a unit represented by the following general formula (III):

(in which $R_3$ stands for $C_{1-10}$, preferably $C_{2-4}$, more preferably $C_2$ or $C_3$, inter alia, $C_3$, straight or branched chain alkylene group; and i is an integer of 1-30, preferably 1-20, inter alia, 1-10, and the i oxyalkylene units,

may be the same or different).

The polymerizable unsaturated monomer (m-6) containing the above unit of the general formula (III) can be obtained by, for example, after the ring-opening addition of cyclic ester to the hydroxyl groups in hydroxyl-containing (meth)acrylates by the means known per se, adding, for example, alkylene oxide to the terminal hydroxyl group in the resulting modification product, and further causing a known phosphorylating agent such as phosphorus pentoxide or phosphorus oxychloride to act on, for example, the terminal hydroxyl group in the addition product, followed by hydrolysis.

As the polymerizable unsaturated monomer (m-6), specifically those represented by the following general formulae (IV), (V), (VII) and (VIII) can be named for example.

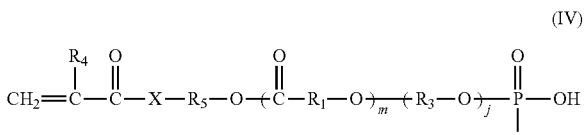

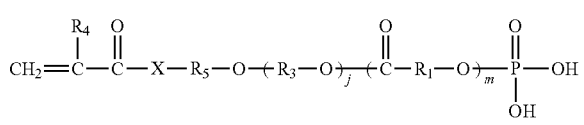

[in the formulae, X stands for oxygen atom or a group represented by the following general formula (VI):

(here Y stands for hydrogen atom or $C_{1-8}$ alkyl, preferably hydrogen atom); j is an integer of 0-30, preferably 0-20, inter alia, 0-10; $R_4$ stands for hydrogen atom or methyl group; and $R_5$ stands for $C_{1-6}$, preferably $C_{2-4}$, inter alia, $C_2$ or $C_3$, alkylene group; the m recurring units,

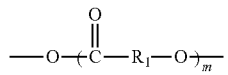 (I)

may be the same or different, the j oxyalkylene units,

may be the same or different, and $R_1$, $R_3$ and m have the same definitions as previously given]

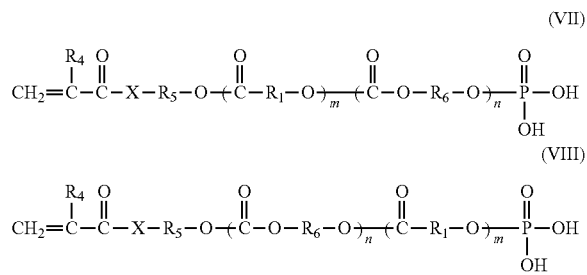

[in the formulae, X, $R_1$, $R_4$, $R_5$ and m have the same definitions as previously given, $R_6$ stands for $C_{1-10}$, preferably $C_{2-6}$, alkylene group, n is an integer of 1-30, preferably 1-20, inter alia, 1-10, the m recurring units,

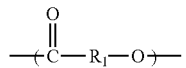

may be the same or different, the n recurring units,

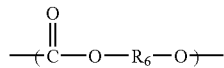

may be the same or different, and the sequence order of the m recurring units,

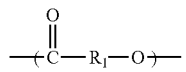

and the n recurring units,

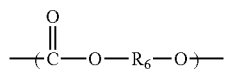

may be in blocks or at random].

These polymerizable unsaturated monomers (m-6) can be used either alone or in combination of two or more.

Polymerizable Unsaturated Monomer (m-7) other than the Polymerizable Unsaturated Monomer (m-6)

Polymerizable unsaturated monomers (m-7) are the polymerizable unsaturated monomers other than the above polymerizable unsaturated monomers (m-6), examples of which are: alkyl or cycloalkyl (meth)acrylates such as methyl (meth) acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth) acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (tradename, Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and tricyclodecanyl (meth)acrylate; polymerizable unsaturated monomers having isobornyl group, such as isobornyl (meth)acrylate; polymerizable unsaturated monomers having adamantyl group, such as adamantyl (meth) acrylate; polymerizable unsaturated monomers having tricyclodecanyl group, such as tricyclodecanyl (meth)acrylate; vinyl aromatic compounds such as styrene, α-methylstyrene and vinyltoluene; polymerizable unsaturated monomers having alkoxysilyl group, such as vinyltrimethoxysilane, vinyltriethoxysilane, vinyltris(2-methoxyethoxy)silane, γ-(meth) acryloyloxypropyltri-methoxysilane and γ-(meth) acryloyloxypropyltriethoxysilane; perfluoroalkyl (meth) acrylates such as perfluorobutylethyl (meth)acrylate and perfluorooctylethyl (meth)acrylate; polymerizable unsaturated monomers having fluorinated alkyl group such as fluoroolefin; polymerizable unsaturated monomers having photopolymerizable functional group like maleimido group; vinyl compounds such as N-vinylpyrrolidone, ethylene, butadiene, chloroprene, vinyl propionate and vinyl acetate; monoesterified products of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth)acrylate; hydroxyl-containing polymerizable unsaturated monomers such as ε-caprolactone-modified products of above monoesterified products of (meth)acrylic acid with $C_{2-8}$ dihydric alcohols, N-hydroxymethyl (meth)acrylamide, allyl alcohol and (meth)acrylate having hydroxyl-terminated polyoxyethylene chain; carboxyl-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-dimethylaminopropyl (meth)acrylamide and addition products of glycidyl (meth)acrylate with amines; polymerizable unsaturated monomers having at least two polymerizable unsaturated groups per molecule, such as allyl (meth) acrylate and 1,6-hexanediol di(meth)acrylate; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allylglycidyl ether; (meth)acrylates having alkoxy-terminated polyoxyethylene chain; sulfonic acid group-containing polymerizable unsaturated monomers such as 2-acrylamido-2-methylpropanesulfonic acid, 2-sulfoethyl (meth)acrylate, allylsulfonic acid, 4-styrenesulfonic acid, and sodium salts or ammonium salts of the foregoing; phosphoric acid group-containing polymerizable unsaturated monomers such as acid phosphoxyethyl (meth)acrylate, acid phosphoxypolyoxyethylene glycol mono(meth)acrylate and acid phosphoxypolyoxypropylene glycol mono(meth)acrylate; polymerizable unsaturated monomers having UV absorbing functional group, such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone and 2-(2'-hydroxy-5'-methacryloyloxyethylphenyl)-2H-benzotriazole; UV-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine; and carbonyl-containing polymerizable unsaturated monomer compounds such as acrolein, diacetoneacrylamide, diacetonmethacrylamide, acetoacetoxyethyl methacrylate, formylstyrol and $C_{4-7}$ vinylalkylketones (e.g., vinyl methyl ketone, vinyl ethyl ketone, vinyl butyl ketone). These can be used either alone or in combination of two or more.

It is particularly preferred for the polymerizable unsaturated monomer (m-7), from the viewpoint of water resistance of the resulting coating film, to contain at least one of the polymerizable unsaturated monomer selected from the group consisting of above vinyl aromatic compounds, polymerizable unsaturated monomers having $C_{6-18}$ alkyl groups and polymerizable unsaturated monomers having $C_{6-18}$ cycloalkyl groups, among which styrene being particularly preferred.

As examples of the polymerizable unsaturated monomers having $C_{6-18}$ alkyl groups, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate and "isostearyl acrylate" (tradename, Osaka Organic Chemical Industry Ltd.) can be named, which may be used either alone or in combination of two or more. Of these, use of polymerizable unsaturated monomers having $C_{8-13}$ alkyl groups, in particular, 2-ethylhexyl (meth)acrylate and/or lauryl (meth)acrylate, is preferred.

As examples of the polymerizable unsaturated monomers having $C_{6-18}$ cycloalkyl groups, cyclohexyl (meth)acrylate, methylcyclohexyl (meth)acrylate, t-butylcyclohexyl (meth) acrylate, cyclododecyl (meth)acrylate, isobornyl (meth)acrylate, adamantyl (meth)acrylate and tricyclodecanyl (meth) acrylate can be named, which may be used either alone or in combination of two or more. Of these, use of polymerizable unsaturated monomers having $C_{8-13}$ cycloalkyl groups, in particular, cyclohexyl (meth)acrylate, is preferred.

Where the polymerizable unsaturated monomer (m-7) contains at least one of the polymerizable unsaturated monomer selected from the group consisting of above vinyl aromatic compounds, polymerizable unsaturated monomers having $C_{6-18}$ alkyl groups and polymerizable unsaturated monomers having $C_{6-18}$ cycloalkyl groups, the combined use amount of the vinyl aromatic compound, polymerizable unsaturated monomer having $C_{6-18}$ alkyl group and polymerizable unsaturated monomer having $C_{6-18}$ cycloalkyl group is preferably within a range of generally 1-96 mass %, in particular, 10-70 mass %, inter alia, 20-60 mass %, based on the total amount of the polymerizable unsaturated monomers (m-1), (m-6) and (m-7).

Also where the polymerizable unsaturated monomer (m-7) contains styrene, the use amount of styrene is preferably within a range of generally 5-70 mass %, in particular, 10-60 mass %, inter alia, 15-50 mass %, based on the total amount of the polymerizable unsaturated monomers (m-6) and (m-7).

While the mixing ratio of those polymerizable unsaturated monomers (m-6) and (m-7) in the polymerizable unsaturated monomeric mixture (a-3) is not strictly limited, generally it can be within the following ranges, based on the total amount of the polymerizable unsaturated monomers (m-6) and (m-7):
polymerizable unsaturated monomer (m-6):
  1-90 mass %, preferably 5-70 mass %, inter alia, 20-60 mass %,
polymerizable unsaturated monomer (m-7):
  10-99 mass %, preferably 30-95 mass %, inter alia, 40-80 mass %, Polymerizable Unsaturated Monomeric Mixture (a-4)

Polymerizable unsaturated monomeric mixture (a-4) is a mixture of the following polymerizable unsaturated monomer (m-8) and polymerizable unsaturated monomer (m-9) other than the polymerizable unsaturated monomer (m-8).

Polymerizable Unsaturated Monomer (m-8)

Polymerizable unsaturated monomer (m-8) is a polymerizable unsaturated monomer containing a divalent group of the following general formula (I):

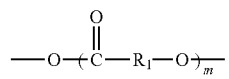

(I)

(in which $R_1$ and m have the previously given definitions, and the m recurring units,

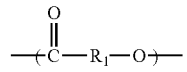

may be the same or different)
and sulfonic acid group.

Such a polymerizable unsaturated monomer (m-8) can be readily synthesized by, for example, modifying hydroxyl-containing (meth)acrylates with cyclic ester, and sulfonating the hydroxyl group in the resulting modification product with a sulfonation agent according to the accepted practice.

As the hydroxyl-containing (meth)acrylates, for example, 2-hydroxyethyl (meth)acrylate and 2- or 3-hydroxypropyl (meth)acrylate can be named.

As the cyclic ester, for example, $C_{3-11}$ lactones such as β-propiolactone, dimethylpropiolactone, γ-butyrolactone, γ-valerolactone, δ-valerolactone, γ-caprolactone, δ-caprolactone, ε-caprolactone, γ-caprylolactone and δ-laurolactone can be named, which may be used either alone or in combination of two or more. Of these, ε-caprolactone is preferred.

Also as the sulfonation agent, those known per se, such as sulfuric anhydride, fuming sulfuric acid, chlorosulfonic acid, sulfuric acid, sodium hydrogensulfite and the like, can be used.

Modification of hydroxyl-containing (meth)acrylates with cyclic ester can be effected by, for example, ring-opening addition of the cyclic ester to hydroxyl groups in the hydroxyl-containing (meth)acrylates, by a method known per se. Then reacting a sulfonation agent with, for example, terminal hydroxyl group in the resulting modified product to sulfonate the same, a polymerizable unsaturated monomer (m-8) can be obtained.

The polymerizable unsaturated monomer (m-8) can further contain a unit represented by the following general formula (III):

 (III)

(in which $R_3$ and i have the same definitions to those given previously, and the i oxyalkylene units,

may be the same or different).

The polymerizable unsaturated monomer (m-8) containing the above unit of the general formula (III) can be obtained by, for example, after the ring-opening addition of cyclic ester to the hydroxyl groups in hydroxyl-containing (meth)acrylates by the means known per se, adding, for example, alkylene oxide to the terminal hydroxyl group in the resulting modification product, and further causing a known sulfonation agent such as conc. sulfuric acid, fuming sulfuric acid, sulfur trioxide, chlorosulfonic acid, sodium sulfite or the like to act on, for example, the terminal hydroxyl group in the addition product.

As the polymerizable unsaturated monomer (m-8), specifically those represented by the following general formulae (IX), (X), (XI) and (XII) can be named:

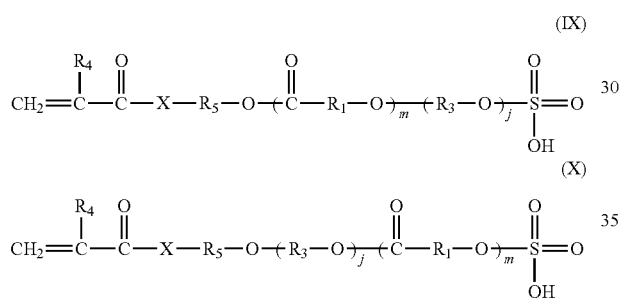

(in the formulae, X, $R_1$, $R_3$, $R_4$, $R_5$, m and j have the previously given definitions, and the m recurring units,

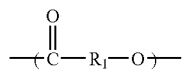

may be the same or different, and the j oxyalkylene units

may be the same or different),

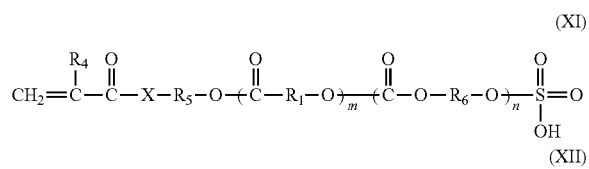

(in which X, $R_1$, $R_4$, $R_5$, $R_6$, m and n have the previously given definitions, the m recurring units,

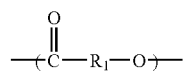

may be the same or different, the n-recurring units,

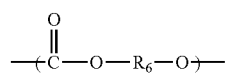

may be the same or different, and the sequence order of the m recurring units,

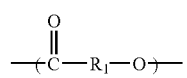

and the n recurring units,

may be in blocks or at random).

These polymerizable unsaturated monomers (m-8) can be used either alone or in combination of two or more.

Polymerizable Unsaturated Monomer (m-9) other than the Polymerizable Unsaturated Monomer (m-8)

Polymerizable unsaturated monomers (m-9) are the polymerizable unsaturated monomers other than the above polymerizable unsaturated monomers (m-8), examples of which are: alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (tradename, Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and tricyclodecanyl (meth)acrylate; polymerizable unsaturated monomers having isobornyl group, such as isobornyl (meth)acrylate; polymerizable unsaturated monomers having adamantyl group, such as adamantyl (meth)acrylate; polymerizable unsaturated monomers having tricyclodecanyl group, such as tricyclodecanyl (meth)acrylate; vinyl aromatic compounds such as styrene, α-methylstyrene and vinyltoluene; polymerizable unsaturated monomers having alkoxysilyl group, such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers having fluorinated alkyl group such as fluoroolefin; polymerizable unsaturated monomers having photopolymerizable functional group like maleimido group; vinyl compounds such as N-vinylpyrrolidone, ethylene, butadiene, chloroprene, vinyl propionate and vinyl acetate; monoesterified products of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth)acrylate; hydroxyl-containing polymerizable unsaturated monomers such as ε-caprolactone-modified products of above monoesterified products of (meth)acrylic acid with $C_{2-8}$ dihydric alcohols, N-hydroxymethyl (meth)acrylamide, allyl alcohol and (meth)acrylate having hydroxyl-terminated polyoxyethylene chain; carboxyl-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-dimethylaminopropyl (meth)acrylamide and addition products of glycidyl (meth)acrylate with amines; polymerizable unsaturated monomers having at least two polymerizable unsaturated groups per molecule, such as allyl (meth)acrylate and 1,6-hexanediol di(meth)acrylate; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allylglycidyl ether; (meth)acrylates having alkoxy-terminated polyoxyethylene chain; sulfonic acid group-containing polymerizable unsaturated monomers such as 2-acrylamido-2-methylpropanesulfonic acid, 2-sulfoethyl (meth)acrylate, allylsulfonic acid, 4-styrenesulfonic acid, and sodium salts or ammonium salts of the foregoing; phosphoric acid group-containing polymerizable unsaturated monomers such as acid phosphoxyethyl (meth)acrylate, acid phosphoxypolyoxyethylene glycol mono(meth)acrylate and acid phosphoxypolyoxypropylene glycol mono(meth)acrylate; polymerizable unsaturated monomers having UV absorbing functional group, such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone and 2-(2'-hydroxy-5'-methacryloyloxyethylphenyl)-2H-benzotriazole; UV-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine; and carbonyl-containing polymerizable unsaturated monomer compounds such as acrolein, diacetoneacrylamide, diacetonmethacrylamide, acetoacetoxyethyl methacrylate, formylstyrol and $C_{4-7}$ vinylalkylketones (e.g., vinyl methyl ketone, vinyl ethyl ketone, vinyl butyl ketone). These can be used either alone or in combination of two or more.

It is particularly preferred for the polymerizable unsaturated monomer (m-9), from the viewpoint of water resistance of the resulting coating film, to contain at least one of the polymerizable unsaturated monomer selected from the group consisting of above vinyl aromatic compounds, polymerizable unsaturated monomers having $C_{6-18}$ alkyl groups and polymerizable unsaturated monomers having $C_{6-18}$ cycloalkyl groups, among which styrene being particularly preferred.

As examples of the polymerizable unsaturated monomers having $C_{6-18}$ alkyl groups, n-hexyl (meth)acrylate, n-octyl (meth)acrylate, 2-ethylhexyl (meth)acrylate, nonyl (meth) acrylate, tridecyl (meth)acrylate, lauryl (meth)acrylate, stearyl (meth)acrylate and "isostearyl acrylate" (tradename, Osaka Organic Chemical Industry Ltd.) can be named, which may be used either alone or in combination of two or more. Of these, use of polymerizable unsaturated monomers having $C_{8-13}$ alkyl groups, in particular, 2-ethylhexyl (meth)acrylate and/or lauryl (meth)acrylate, is preferred.

As examples of the polymerizable unsaturated monomers having $C_{6-18}$ cycloalkyl groups, cyclohexyl (meth)acrylate, methylcyclohexyl (meth)acrylate, t-butylcyclohexyl (meth) acrylate, cyclododecyl (meth)acrylate, isobornyl (meth)acrylate, adamantyl (meth)acrylate and tricyclodecanyl (meth) acrylate can be named, which may be used either alone or in combination of two or more. Of these, use of polymerizable unsaturated monomers having $C_{8-13}$ cycloalkyl groups, in particular, cyclohexyl (meth)acrylate, is preferred.

Where the polymerizable unsaturated monomer (m-9) contains at least one of the polymerizable unsaturated monomer selected from the group consisting of above vinyl aromatic compounds, polymerizable unsaturated monomers having $C_{6-18}$ alkyl groups and polymerizable unsaturated monomers having $C_{6-18}$ cycloalkyl groups, the combined use amount of the vinyl aromatic compound, polymerizable unsaturated monomer having $C_{6-18}$ alkyl group and polymerizable unsaturated monomer having $C_{6-18}$ cycloalkyl group is preferably within a range of generally 1-96 mass %, in particular, 10-70 mass %, inter alia, 20-60 mass %, based on the total amount of the polymerizable unsaturated monomers (m-8) and (m-9).

Also where the polymerizable unsaturated monomer (m-9) contains styrene, the use amount of styrene is preferably within a range of generally 5-70 mass %, in particular, 10-60 mass %, inter alia, 15-50 mass %, based on the total amount of the polymerizable unsaturated monomers (m-8) and (m-9).

While the mixing ratio of those polymerizable unsaturated monomers (m-8) and (m-9) in the polymerizable unsaturated monomeric mixture (a-4) is not strictly limited, generally it can be within the following ranges, based on the total amount of the polymerizable unsaturated monomers (m-8) and (m-9):

polymerizable unsaturated monomer (m-8):
  1-90 mass %, preferably 5-70 mass %, inter alia, 20-60 mass %, polymerizable unsaturated monomer (m-9):
  10-99 mass %, preferably 30-95 mass %, inter alia, 40-80 mass %, Pigment-dispersing Resin (A)

According to the present invention, copolymerizing a polymerizable unsaturated monomeric mixture (a) selected from the above-described polymerizable unsaturated monomeric mixtures (a-1) to (a-4), preferably the polymerizable unsaturated monomeric mixture (a-1) or (a-3), in a reaction solvent (b) which contains at least 30 mass %, based on the total amount of the reaction solvent, of an organic solvent (b-1) which does not contain hydroxyl group and has a solubility in water at 20° C. of at least 100 mass %, a pigment-dispersing resin (A) having divalent groups of the general formula, (I):

(in which $R_1$ and m have the previously given definitions, and the m recurring units,

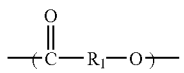

may be the same or different),
phosphoric acid groups and/or sulfonic acid groups can be produced.

Organic Solvent (b-1)

The organic solvent (b-1) is an organic solvent which does not contain hydroxyl group and has a solubility in water at 20° C. of at least 100 mass %. In the present invention, "an organic solvent having a solubility in water at 20° C. of at least 100 mass %" refers to an organic solvent which, when 5 g of the organic solvent and 5 g of water are put in an agitating container and shaken at 20° C. for 5 minutes, no turbidity or phase separation is visually observable in the resulting liquid mixture which is in homogeneous state.

As the organic solvent (b-1), for example, ether solvents such as 1,4-dioxane, tetrahydrofuran, ethylene glycol dimethyl ether, diethylene glycol dimethyl ether, propylene glycol dimethyl ether and dipropylene glycol dimethyl ether; amide solvents such as N,N-dimethylacetamide, N,N-dimethylformamide, N-methyl-2-pyrrolidone and N,N-dimethyl-β-methoxypropionamide; urea solvents such as 1,3-dimethyl-2-imidazolidinone; sulfoxide solvents such as dimethylsulfoxide; and sulfone solvents such as tetramethylenesulfone can be named, which are useful either alone or in combination of two or more. Of these, above ether solvents, amide solvents and urea solvents are preferred as the organic solvent (b-1), amide solvents being particularly preferred.

Reaction Solvent (b)

The reaction solvent (b) contains at least 30 mass %, preferably 50-100 mass %, in particular, 80-100 mass %, inter alia, 95-100 mass % of above organic solvent (b-1), based on the total mass of the reaction solvent (b).

Examples of organic solvents other than the organic solvent (b-1), which the reaction solvent (b) can contain, include: hydrocarbon solvents such as heptane, toluene, xylene, octane and mineral spirit; ester solvents such as ethyl acetate, n-butyl acetate, isobutyl acetate, ethylene glycol monomethyl ether acetate and diethylene glycol monobutyl ether acetate; ketone solvents such as methyl ethyl ketone, methyl isobutyl ketone, diisobutyl ketone and cyclohexanone; ether solvents such as n-butyl ether, ethylene glycol monomethyl ether and ethylene glycol monoethyl ether; and aromatic petroleum solvents such as SWAZOL 310, SWAZOL 1000, SWAZOL 1500 and the like of COSMO OIL Co., Ltd. These organic solvents can be used either alone or in combination of two or more.

Copolymerization

Copolymerization of the polymerizable unsaturated monomeric mixture (a) can be conducted by any methods known per se, among which solution polymerization in an organic solvent being preferred. As the copolymerization process by the solution polymerization, for example, a process comprising dissolving or dispersing a mixture of a polymerizable unsaturated monomeric mixture (a) with a radical polymerization initiator in a reaction solvent (b), and polymerizing the same by heating at temperatures of normally from about 80° C. to about 200° C. for around 1-10 hours under stirring, can be used. In the polymerization reaction, the reaction solvent (b) may be used at a ratio normally ranging 10-300 mass parts, preferably 30-200 mass parts, inter alia, 50-150 mass parts, per 100 mass parts of the polymerizable unsaturated monomeric mixture (a).

As the radical polymerization initiator, for example, organoperoxide polymerization initiators including ketone peroxides such as cyclohexanone peroxide, 3,3,5-trimethylcyclohexanone peroxide and methylcyclohexanone peroxide; peroxyketals such as 1,1-bis(tert-butylperoxy)-3,3,5-trimethylcyclohexane, 1,1-bis(tert-butylperoxy)cyclohexane and n-butyl-4,4-bis(tert-butylperoxy)valerate; hydroperoxides such as cumene hydroperoxide and 2,5-dimethylhexane-2,5-dihydroperoxide; dialkyl peroxides such as 1,3-bis(tert-butylperoxy-m-isopropyl)benzene, 2,5-dimethyl-2,5-di(tert-butylperoxy)hexane, diisopropylbenzene peroxide and tert-butylcumyl peroxide; diacyl peroxides such as decanoyl peroxide, lauroyl peroxide, benzoyl peroxide and 2,4-dichlorobenzoyl peroxide; peroxy carbonates such as bis(tert-butylcyclohexyl)-peroxydicarbonate; and peroxyesters such as tert-butylperoxybenzoate and 2,5-dimethyl-2,5-di(benzolyperoxy)hexane: and azo polymerization initiators including 2,2'-azobisisobutyronitrile, 1,1-azobis(cyclohexane-1-carbonitrile), azocumene 2,2'-azobismethylvaleronitrile and 4,4'-azobis(4-cyanovaleric acid) can be named. While use amount of these radical polymerization initiators is not particularly limited, desirably it is within a range of normally 0.1-15 mass parts, in particular, 0.3-10 mass parts, per 100 mass parts of the polymerizable unsaturated monomeric mixture (a).

The method of adding the monomeric components or polymerization initiator in the above polymerization reaction is subject to no particular limitation, but from the viewpoints of temperature control during the polymerization reaction and suppression of occurrence of poor crosslinked product such as gelated product, it is recommendable to add the polymerization initiator dropwise, as divided into plural portions over from the initial stage of polymerization to the late stage, rather than feeding it all at once in the initial stage of the polymerization.

Thus obtained pigment-dispersing resin (A) suitably has an acid value within a range of generally 30-200 mgKOH/g, in particular 45-180 mgKOH/g, inter alia, 60-150 mgKOH/g, from the viewpoint of water resistance of the resulting coating film.

In the subject specification the "acid value" is determined as follows. A test sample is dissolved or dispersed in propylene glycol monomethyl ether, and titrated at 25° C. with an ethanol solution of potassium hydroxide, using phenolphthalein as the indicator, the point at which the tested liquid turns pale pink is recorded as the end point, and from which the value is calculated according to the following equation:

$$\text{acid value (mgKOH/g)} = 56.1 \times V \times C / m$$

V=volume of the titrant added (ml),
C=concentration of the titrant (mol/l),
m=solid weight of the test sample (g).

Also from the viewpoint of water resistance of the resulting coating film, the pigment-dispersing resin (A) preferably has a hydroxyl value within a range of generally 10-200 mgKOH/g, in particular, 20-180 mgKOH/g, inter alia, 30-150 mgKOH/g.

Furthermore, from the viewpoint of the appearance and water resistance of the resulting coating film, the pigment-dispersing resin (A) preferably has a number-average molecular weight within a range of generally 2,000-200,000, in particular, 4,000-100,000, inter alia, 10,000-50,000.

In the present specification, "number-average molecular weight" and "weight-average molecular weight" are determined by converting the number-average molecular weight or weight-average molecular weight as measured with gel permeation chromatograph (HLC8120GPC, tradename, Tosoh Corporation), based on the molecular weight of standard polystyrene. The measurement is conducted using four columns of TSKgel G-4000HXL, TSKgel G-3000HXL, TSKgel G-2500HXL and TSKgel G-2000HXL (tradename, Tosoh Corporation) under the conditions of mobile phase: tetrahydrofuran, measuring temp.: 40° C., flow rate: 1 cc/min. and detector: RI.

The pigment-dispersing resin (A) preferably contains the divalent group(s) represented by the following general formula (I):

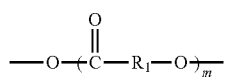

(in which $R_1$ and m have the previously given definitions, and the m recurring units,

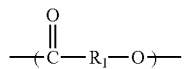

may be the same or different)

at a mass ratio within a range of generally 1-70 mass %, in particular, 5-60 mass %, inter alia, 10-50 mass %, based on the mass of the pigment-dispersing resin (A).

Pigment Dispersion

The pigment-dispersing resin (A) as prepared in the above manner can be formed into a pigment dispersion, upon being mixed with pigment (B), and where necessary, solvent, pigment-dispersing agent, and other additives.

Pigment (B)

Examples of pigment (B) include effect pigments (B1) such as aluminium, copper, brass, nickel, aluminium oxide, mica, aluminium oxide coated with titanium oxide or iron oxide, mica coated with titanium oxide or iron oxide, and bright graphite; coloring pigments (B2) such as titanium dioxide, zinc flower, Carbon Black, red iron oxide, Molybdate Red, Prussian Blue, Cobalt Blue, azo pigment, phthalocyanine pigment, quinacridone pigment, isoindoline pigment, vat pigment, perylene pigment, dioxazine pigment, isoindolinone pigment and diketopyrrolopyrrole pigment; extenders (B3) such as clay, kaoline, barium sulfate, barium carbonate, calcium carbonate, talc, silica, alumina white and the like. They can be used either alone or in combination of two or more. Those pigments may also be those given a per se known surface treatment, such as acid treatment, base treatment, coupling agent treatment, plasma treatment, oxidation treatment, reduction treatment or the like.

As the pigment (B), use of, the effect pigment (B1) and/or coloring pigment (B2) is preferred, in particular, use of the effect pigment is preferred.

As the effect pigment (B1), use of, for example, aluminium, aluminium oxide, mica, titanium dioxide- or iron oxide-coated aluminium oxide or titanium dioxide- or iron oxide-coated mica is preferred, in particular, use of aluminium is preferred.

The effect pigment (B1) is preferably in the form of flakes. For the flaky effect pigment (B1), it is adequate to have a longitudinal dimension of around 1-100 μm, preferably around 5-40 μm, and a thickness of around 0.001-5 μm, preferably 0.01-2 μm.

Again, where the effect pigment (B1), in particular, aluminium pigment, is used as at least a part of the pigment (B), the pigment-dispersing resin (A) is preferably a copolymer of the polymerizable unsaturated monomeric mixture (a-1) and/or a copolymer of the polymerizable unsaturated monomeric mixture (a-3), a copolymer of the polymerizable unsaturated monomeric mixture (a-3) being particularly preferred, from the viewpoint of excellent appearance of the resulting coating film.

While the blend ratio of the pigment (B) is subject to no particular limitation, it is preferably within a range of normally 10-3,000 mass parts, in particular, 15-2,000 mass parts, inter alia, 20-1,500 mass parts, per 100 mass parts of solid resin content of the pigment-dispersing resin (A).

As the solvent to be used where necessary, water and/or organic solvent can be named. Examples of the organic solvent include: hydrocarbon solvents such as toluene, xylene and mineral spirit; ester solvents such as ethyl acetate, n-butyl acetate, isobutyl acetate, ethylene glycol monomethyl ether acetate and butyl carbitol acetate; ketone solvents such as methyl ethyl ketone, methyl isobutyl ketone and diisobutyl ketone; alcohol solvents such as methanol, ethanol, isopropanol, 1-butanol, 2-butanol, isobutanol, 1-hexanol, 1-octanol, 2-octanol, 2-ethylhexanol, 1-decanol, benzyl alcohol, diethylene glycol, ethylene glycol monomethyl ether, ethylene glycol monoethyl ether, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether and propylene glycol monophenyl ether; ether solvents such as ethyl butyl ether, dibutyl ether, diisobutyl ether, 1,4-dioxane, ethylene glycol dimethyl ether, diethylene glycol dimethyl ether, propylene glycol dimethyl ether and dipropylene glycol dimethyl ether; amide solvents such as N,N-dimethylacetamide, N,N-dimethylformamide, N-methyl-2-pyrrolidone and N,N-dimethyl-β-methoxypropionamide; and aromatic petroleum solvents such as SWAZOL 310, SWAZOL 1000 and SWAZOL 1500 made by COSMO Oil Co., Ltd. These organic solvents can be used either alone or as a mixture of two or more.

Where the pigment dispersion contains such solvent(s) as described above, the blend ratio of the solvent is not critical, but preferably it is within a range of normally 50-5,000 mass parts, in particular, 100-3,000 mass parts, inter alia, 100-2,000 mass parts, per 100 mass parts of the solid resin content of the pigment-dispersing resin (A).

The pigment dispersion can be prepared by uniformly mixing and dispersing the above-described components with, for example, paint shaker, Skandex, dispersing device or the like.

Paint Compositions

The pigment dispersion as prepared in the above can be formulated into a paint composition, as mixed with binder resin for paint and, where necessary, various paint additives such as solvent, curing catalyst, fine polymer particles, ultraviolet absorber, light stabilizer, thickener, basic neutralizer, coated surface regulating agent, antioxidant, silane coupling agent and the like. The paint composition preferably is water-based.

"Water-based paint" is a term used in contradistinction to "organic solvent-based paint", and generally signifies paint which is formed by dispersing and/or dissolving binder resin for paint, pigment and the like in water or a medium whose chief component is water (aqueous medium). Where a paint composition is water-based, it conveniently contains 10-90 mass parts, preferably 20-80 mass parts, inter alia, 30-70 mass parts, of water, per 100 mass parts of the paint composition, for reducing environmental load.

The binder resin for paint encompasses combinations of base resin and curing agent (D) which are customarily used in the field of paint. As the base resin, those which have been conventionally used for water-based paint and which are known per se can be used, for example, water-soluble or water-dispersible resins based on alkyd resins, acrylic resins, polyester resins, polyurethane resins and the like. These resins preferably contain in their molecules crosslinkable functional groups such as hydroxyl, carboxyl or epoxy groups. In particular, base resins preferably are hydroxy-containing resins (C), inter alia, hydroxyl-containing acrylic resin (C1) and/or hydroxyl-containing polyester resin (C2).

Hydroxyl-containing acrylic resin (C1) can be produced by (co)polymerizing a polymerizable unsaturated monomeric component comprising hydroxyl-containing polymerizable unsaturated monomer (c-1) hereinafter described, by a method known per se, for example, solution polymerization in organic solvent, emulsion polymerization in water, or the like.

Hydroxyl-containing polymerizable unsaturated monomer (c-1) is a compound containing at least one each of hydroxyl group and polymerizable unsaturated bond per molecule, examples of which including monoesterified products of (meth)acrylic acid with $C_{2-8}$ dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified products of the monoesterified products of (meth)acrylic acid with $C_{2-8}$ dihydric alcohols; N-hydroxymethyl (meth)acrylamide; allyl alcohol, and (meth)acrylate having polyoxyethylene chain of which molecular terminal is hydroxyl group. These monomers (c-1) can be used either alone or in combination of two or more.

As other polymerizable unsaturated monomers which can be copolymerized with such hydroxyl-containing polymerizable unsaturated monomers (c-1), for example, alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (tradename, Osaka Organic Chemical Industry Ltd.), cyclohexyl (meth)acrylate, methylcyclohexyl (meth)acrylate, t-butylcyclohexyl (meth)acrylate, and cyclododecyl (meth)acrylate; polymerizable unsaturated monomers having isobornyl group, such as isobornyl (meth)acrylate; polymerizable unsaturated monomers having adamantyl group, such as adamantyl (meth)acrylate; vinyl aromatic compounds such as styrene, α-methylstyrene and vinyltoluene; polymerizable unsaturated monomers having alkoxysilyl group, such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers having fluorinated alkyl group such as fluoroolefin; polymerizable unsaturated monomers having photo-polymerizable functional group like maleimido group; vinyl compounds such as N-vinylpyrrolidone, ethylene, butadiene, chloroprene, vinyl propionate and vinyl acetate; carboxyl-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-dimethylaminopropyl (meth)acrylamide and addition products of glycidyl (meth)acrylate with amines; polymerizable unsaturated monomers having at least two polymerizable unsaturated groups per molecule, such as allyl (meth)acrylate and 1,6-hexanediol di(meth)acrylate; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allylglycidyl ether; (meth)acrylates having alkoxy-terminated polyoxyethylene chain; sulfonic acid group-containing polymerizable unsaturated monomers such as 2-acrylamido-2-methylpropanesulfonic acid, allylsulfonic acid, styrenesulfonic acid and sulfoethyl methacrylate; sodium salts or ammonium salts of the sulfonic acid group-containing polymerizable unsaturated monomers; polymerizable unsaturated monomers having phosphoric acid group such as 2-acryloyloxyethyl acid phosphate, 2-methacryloyloxyethyl acid phosphate, 2-acryloyloxypropyl acid phosphate and 2-methacryloyloxypropyl acid phosphate; polymerizable unsaturated monomers having UV absorbing functional group, such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone and 2-(2'-hydroxy-5'-methacryloyloxyethylphenyl)-2H-benzotriazole; UV-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine; carbonyl-containing polymerizable unsaturated monomers such as acrolein, diacetoneacrylamide, diacetonmethacrylamide, acetoacetoxyethyl methacrylate, formylstyrol and $C_{4-7}$ vinyl alkyl ketones (e.g., vinyl methyl ketone, vinyl ethyl ketone, vinyl butyl ketone); and polymerizable unsaturated monomers having cationic functional group such as tertiary amino group, quaternary ammonium salt group or the like. These polymerizable unsaturated monomers (a2-2) can be used either alone or in combination of two or more.

The hydroxyl-containing acrylic resin (C1) preferably also contains amido group. Hydroxyl-containing acrylic resin having amido groups can be produced, for example, by using as at least a part of the other polymerizable unsaturated monomer which is copolymerizable with the hydroxyl-containing polymerizable unsaturated monomer (c-1), amido-containing polymerizable unsaturated monomer such as (meth)acrylamide, N-methylol (meth)acrylamide and N,N-dimethylaminopropyl (meth)acrylamide.

From the viewpoint of storage stability and water resistance of resulting coating film, the hydroxyl-containing acrylic resin (C1) preferably has a hydroxyl value within a range of normally 1-200 mgKOH/g, in particular, 2-80 mgKOH/g, inter alia, 5-50 mgKOH/g.

Where the hydroxyl-containing acrylic resin (C1) contains an acid group such as carboxyl group, it preferably has an acid value within a range of normally 5-150 mgKOH/g, in particular, 10-100 mgKOH/g, inter alia, 15-70 mgKOH/g, from the viewpoint of water resistance of the resulting coating film.

Furthermore, the hydroxyl-containing acrylic resin (C1) suitably has a weight-average molecular weight within a range of generally 2,000-1,000,000, in particular, 3,000-200,000, inter alia, 5,000-100,000.

The hydroxyl-containing acrylic resin (C1) is preferably a core-shell type water-dispersible acrylic resin (C1') composed of a core part formed of a copolymer (I) obtained from a monomeric mixture of 0.1-30 mass % of a polymerizable unsaturated monomer (c-2) having at least two polymerizable unsaturated groups per molecule and 70-99.9 mass % of a polymerizable unsaturated monomer (c-3) having one polymerizable unsaturated group per molecule; and a shell part formed of a copolymer (II) obtained from a monomeric mixture of 1-35 mass % of the hydroxyl-containing unsaturated monomer (c-1), 5-60 mass % of hydrophobic polymerizable unsaturated monomer (c-4) and 5-94 mass % of still other polymerizable unsaturated monomer (c-5) from the viewpoint of the appearance and water resistance of the resulting coating film; the ratio of the copolymer (I)/copolymer (II) being within a range of, in terms of solid mass ratio, 10/90-90/10, in particular, 50/50-85/15, inter alia, 65/35-80/20, for improving appearance of the coating film.

In the present specification, "polymerizable unsaturated group" signifies radical-polymerizable unsaturated group. As such polymerizable unsaturated group, for example, vinyl group and (meth)acryloyl group can be named.

Examples of the monomer (c-2) include: allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, divinylbenzene, methylenebis(meth)acrylamide and ethylenebis(meth)acrylamide. These monomers can be used either alone or in combination of two or more.

The monomer (c-2) has the function to impart a crosslinked structure to the core part copolymer (I), and the use ratio of the monomer (c-2) can be suitably decided according to the extent of crosslinkage of the core part copolymer (I). Whereas, it is generally preferred to use it within a range of normally 0.1-30 mass %, in particular, 0.5-10 mass %, inter alia, 1-7 mass %, based on the total amount of the monomers (c-2) and (c-3).

As the monomer (c-2), use of polymerizable unsaturated monomer (c-2') having at least two polymerizable unsaturated groups and at least one amido group per molecule is preferred, for the excellent appearance of the resulting coating film. Examples of the monomer (c-2') include methylenebis(meth)acrylamide and ethylenebis(meth)acrylamide. These monomers can be used either alone or in combination of two or more. When used, the preferred amount of the monomer (c-2') is within a range of normally 0.1-25 mass %, in particular, 0.5-9 mass %, inter alia, 1-4 mass %, based on the total amount of the monomers (c-2) and (c-3).

The monomer (c-3) which is used as the monomer for the core part copolymer (I) is such that is copolymerizable with the polymerizable unsaturated monomer (c-2) having at least two polymerizable unsaturated groups per molecule. Specific examples of the monomer (c-3) include alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (tradename, Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and tricyclodecanyl (meth)acrylate; polymerizable unsaturated monomers having isobornyl group, such as isobornyl (meth)acrylate; polymerizable unsaturated monomers having adamantyl group, such as adamantyl (meth)acrylate; polymerizable unsaturated monomers having tricyclodecanyl group, such as tricyclodecanyl (meth)acrylate; aromatic ring-containing polymerizable unsaturated monomers such as styrene, α-methylstyrene, vinyltoluene and benzyl (meth)acrylate; polymerizable unsaturated monomers having alkoxysilyl group, such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers having fluorinated alkyl group such as fluoroolefin; polymerizable unsaturated monomers having photo-polymerizable functional group like maleimido group; vinyl compounds such as N-vinylpyrrolidone, ethylene, butadiene, chloroprene, vinyl propionate and vinyl acetate; monoesterified products of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth)acrylate; these monoesterified products of (meth)acrylic acid with $C_{2-8}$ dihydric alcohols which are modified with ε-caprolactone; hydroxyl-containing polymerizable unsaturated monomers such as N-hydroxymethyl (meth)acrylamide, allyl alcohol and (meth)acrylate having hydroxyl-terminated polyoxyethylene chain; carboxyl-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide and addition products of glycidyl (meth)acrylate with amines; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allylglycidyl ether; (meth)acrylates having alkoxy-terminated polyoxyethylene chain. These monomers can be used either alone or in combination of two or more, according to the performance required of the core-shell type water-dispersible, hydroxyl-containing acrylic resin.

Specific examples of the monomer (c-1) include, as aforesaid, monoesterified products of (meth)acrylic acid with $C_{2-8}$ dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified products of the monoesterified products of (meth)acrylic acid with $C_{2-8}$ dihydric alcohols; N-hydroxymethyl (meth)acrylamide, allyl alcohol, and (meth)acrylate having polyoxyethylene chain of which molecular terminal is hydroxyl group. These monomers can be used either alone or in combination of two or more.

The use ratio of the monomer (c-1) preferably is within a range of normally 1-40 mass %, in particular, 4-25 mass %, inter alia, 7-19 mass %, based on the total mass of the monomers constituting the shell part copolymer (II), for excellent stability of the core-shell type water-dispersible acrylic resin in aqueous medium and water resistance of the resulting coating film.

Monomer (c-4) which is used as a monomer for shell part copolymer (II) is a polymerizable unsaturated monomer containing at least $C_6$ straight or branched chain or cyclic saturated or unsaturated hydrocarbon group, excepting hydrophilic group-containing monomers such as hydroxyl-containing polymerizable unsaturated monomers. Examples of the monomer (c-4) include alkyl or cycloalkyl (meth)acrylates such as n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (tradename, Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and tricyclodecanyl (meth) acrylate; polymerizable unsaturated monomers having isobornyl group, such as isobornyl (meth)acrylate; polymerizable unsaturated monomers having adamantyl group, such as adamantyl (meth)acrylate; aromatic ring-containing polymerizable unsaturated monomers such as styrene, α-methylstyrene, vinyltoluene and benzyl (meth)acrylate. These monomers can be used either alone or in combination of two or more.

It is preferred to use as the monomer (c-4) a polymerizable unsaturated monomer having $C_{6-18}$ alkyl group and/or aromatic ring-containing polymerizable unsaturated monomer, in particular, styrene, for improving the appearance of resulting coating film.

The use ratio of the monomer (c-4) is preferably within a range of generally 5-60 mass %, in particular, 7-40 mass %, inter alia, 9-30 mass %, based on the total mass of the monomers constituting the shell part copolymer (II), for excellent stability of the core-shell type water-dispersible acrylic resin in aqueous medium and water resistance of the resulting coating film.

When styrene is used as the monomer (c-4), the use ratio of styrene is preferably within a range of generally 5-50 mass %, in particular, 7-30 mass %, inter alia, 9-20 mass %, based on the total mass of the monomers constituting the shell part copolymer (II).

Monomer (c-5) which is used as a monomer for the shell part copolymer (II) includes polymerizable unsaturated monomers other than the monomers (c-1) and (c-4), for example, alkyl or cycloalkyl (meth)acrylate such as methyl (meth)acrylate, ethyl (meth)acrylate, n-propyl (meth)acrylate, i-propyl (meth)acrylate, n-butyl (meth)acrylate, i-butyl (meth)acrylate and tert-butyl (meth)acrylate; and carboxyl-containing polymerizable unsaturated monomers. These monomers can be used either alone or in combination of two or more.

As specific examples of the carboxyl-containing polymerizable unsaturated monomer, those named as the monomers for the above-described core part copolymer (I) can be named, acrylic acid and/or methacrylic acid being particularly preferred.

Use of the carboxyl-containing polymerizable unsaturated monomer as at least a part of the monomer (c-5) allows to secure stability of the resulting core-shell type water-dispersible acrylic resin in aqueous medium.

Where such a carboxyl-containing polymerizable unsaturated monomer is used, its use ratio is preferably within a range of normally 1-40 mass %, in particular, 6-25 mass %, inter alia, 7-19 mass %, based on the total mass of the monomers constituting the shell part copolymer (II), for excellent paint stability and water resistance of resulting coating film.

Also from the viewpoint of improving appearance of the resulting coating film, it is preferred not to use any polymerizable unsaturated monomer having at least two polymerizable unsaturated groups per molecule as the monomer (c-5) for constituting the shell part copolymer (II), to render the copolymer (II) uncrosslinked type.

The core-shell type water-dispersible acrylic resin (C1') preferably has a hydroxyl value within a range of generally 1-70 mgKOH/g, in particular, 2-50 mgKOH/g, inter alia, 5-30 mgKOH/g, for excellent water resistance of resulting coating film.

Furthermore, the core-shell type water-dispersible acrylic resin (C1') preferably has an acid value within a range of generally 5-90 mgKOH/g, in particular, 8-50 mgKOH/g, inter alia, 10-35 mgKOH/g, from the viewpoint of storage stability of the paint composition and excellent water resistance of resulting coating film.

The core-shell type water-dispersible acrylic resin (C1') can be prepared, for example, by emulsion polymerizing a monomeric mixture composed of 0.1-30 mass % of monomer (c-2) and 70-99.9 mass % of monomer (c-3) to form an emulsion of the core part copolymer (I), thereafter adding into this emulsion a monomeric mixture composed of 1-35 mass % of monomer (c-1), 5-60 mass % of monomer (c-4) and 5-94 mass % of monomer (c-5), and further emulsion polymerizing the system to form the shell part copolymer (II).

The emulsion polymerization for preparing an emulsion of the core part copolymer (I) can be carried out by a method known Per se, for example, by emulsion polymerizing the monomeric mixture using a polymerization initiator, in the presence of an emulsifier.

As the emulsifier, anionic emulsifier or nonionic emulsifier are suitable, examples of the anionic emulsifier including sodium salt or ammonium salt of alkylsulfonic acid, alkylbenzenesulfonic acid, alkylphosphoric acid and the like. Examples of the nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate and polyoxyethylene sorbitan monolaurate.

Polyoxyalkylene-containing anionic emulsifier having an anionic group and polyoxyalkylene group such as polyoxyethylene group or polyoxypropylene group per molecule; or reactive anionic emulsifier having anionic group and radical-polymerizable unsaturated group per molecule, can also used as the emulsifier. Of these, use of reactive anionic emulsifier is preferred.

As examples of the reactive anionic emulsifier, sodium salts or ammonium salts of sulfonic acid compounds having radical-polymerizable unsaturated groups such as (meth)allyl, (meth)acryloyl, propenyl, butenyl group and the like can be named. Because of excellent water resistance of resulting coating film, ammonium salts of sulfonic acid compounds having such radical-polymerizable unsaturated groups are preferred among the above-named. As commercially available ammonium salt of such sulfonic acid compound, for example, LATEMUL S-180A (tradename, KAO Corporation) can be named.

Among the ammonium salts of sulfonic acid compounds having radical polymerizable unsaturated groups, those of sulfonic acid compounds having radical-polymerizable unsaturated group and polyoxyalkylene group are preferred. As commercially available ammonium salt of sulfonic acid compound having radical-polymerizable unsaturated group and polyoxyalkylene group, for example, AQUALON KH-10 (tradename, Dai-ichi Kogyo Seiyaku Co., Ltd.) and SR-1025A (tradename, ADEKA Corporation) can be named.

Preferred use amount of such an emulsifier is, based on the total amount of all the monomers used, within a range of normally 0.1-15 mass %, in particular, 0.5-10 mass %, inter alia, 1-5 mass %.

As the polymerization initiator, for example, organic peroxides such as benzoyl peroxide, octanoyl peroxide, lauroyl peroxide, stearoyl peroxide, cumene hydroperoxide, tert-butyl peroxide, tert-butyl peroxylaurate, tert-butylperoxyisopropylcarbonate, tert-butylperoxyacetate and diisopropylbenzene hydroperoxide; azo compounds such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethylazobis(2-methylpropionate), azobis [2-methyl-N-(2-hydroxyethyl)-propionamide] and azobis{2-methyl-N-[2-(1-hydroxybutyl)]-propionamide}; and persulfates such as potassium persulfate, ammonium persulfate and sodium persulfate can be named. These polymerization initiators can be used either alone or in combination of two or more. Above polymerization initiators may also be used concurrently with such a reducing agent as sugar, sodiumformaldehyde sulfoxylate, iron complex or the like, to act as redox initiator.

The use amount of above polymerization initiator preferably is, based on the total mass of all the monomers used, within a range of generally 0.1-5 mass %, in particular, 0.2-3 mass %. Method of adding the polymerization initiator is not particularly limitative, but can be suitably selected according to its kind, amount and the like. For example, it may be advancedly contained in the monomeric mixture or aqueous medium, or may be added in lump or added dropwise at the time of polymerization.

The core-shell type water-dispersible acrylic resin (C1') can be obtained by adding a monomeric mixture composed of the above monomers (c-1), (c-4) and (c-5) to an emulsion of the core part copolymer (I) as obtained in the above, and further polymerizing to form the shell part copolymer (II).

The monomeric mixture for making the shell part copolymer (II) can suitably contain, where necessary, such components as aforedescribed polymerization initiator, chain transfer agent, reducing agent, emulsifier and the like.

The monomeric mixture may be dropped as it is, but preferably it is dispersed in an aqueous medium to form a monomeric emulsified product and dropped. The particle size of the monomeric emulsified product in that occasion is not particularly limited.

As the polymerization method of the monomeric mixture to form the shell part copolymer (II), for example, a method of adding in lump or slowly dropwise, the monomeric mixture or the monomeric emulsified product to an emulsion of the core part copolymer (I), followed by heating the system to an adequate temperature under stirring, can be used.

Thus obtained core-shell type water-dispersible acrylic resin (C1') has a multilayer structure in which a copolymer (I) of a monomeric mixture of the monomers (c-2) and (c-3) forms the core and a copolymer (II) of a monomeric mixture of the monomers (c-1), (c-4) and (c-5) forms the shell.

The core-shell type water-dispersible acrylic resin (C1') can generally have an average particle size of about 10-1,000 nm, in particular, about 20-500 nm.

In the present specification, the average particle diameter of the core-shell type water-dispersible acrylic resin (C1') is the value measured with a submicron particle size distribution measuring device according to the customarily practiced method, as to the test specimen as diluted with deionized water, at 20° C. As the submicron particle size distribution measuring device, for example, COULTER N4 Model (tradename, Beckman Coulter, Inc.) can be used.

With the view to improve mechanical stability of the core-shell type water-dispersible acrylic resin (C1') particles, it is desirable to neutralize the acidic groups such as carboxyl groups in the water-dispersible acrylic resin (C1') with a neutralizer. The neutralizer is subject to no particular limitation so long as it can neutralize acidic groups and, for example, sodium hydroxide, potassium hydroxide, trimethylamine, 2-(dimethylamino)ethanol, 2-amino-2-methyl-1-propanol, triethylamine and aqueous ammonia can be used. These neutralizers are preferably used in an amount as will render the pH of an aqueous dispersion of the neutralized water-dispersible acrylic resin around 6.5-9.0.

In the paint composition of the present invention, smoothness of coating film formed therefrom can be improved by using hydroxy-containing polyester resin (C2) as the hydroxyl-containing resin (C).

Hydroxyl-containing polyester resin (C2) can be usually prepared by esterification reaction or ester-interchange reaction of acid component with alcohol component.

As the acid component, those compounds customarily used as acid component in production of polyester resins can be used, examples of which including aliphatic polybasic acid, alicyclic polybasic acid and aromatic polybasic acid.

The aliphatic polybasic acid encompasses aliphatic compounds having at least two carboxyl groups per molecule, acid anhydrides of the aliphatic compounds and esterified products of the aliphatic compounds. Examples of aliphatic polybasic acid include aliphatic polyvalent carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid and citric acid; anhydrides of those aliphatic polyvalent carboxylic acids; and $C_{1-4}$ lower alkyl esters of those aliphatic polyvalent carboxylic acids. Those aliphatic polybasic acids can be used either alone or in combination of two or more. From the viewpoint of smoothness of resulting coating film, use of adipic acid and/or adipic anhydride as the aliphatic polybasic acid is particularly preferred.

The alicyclic polybasic acid generally encompasses compounds having at least one alicyclic structure and at least two carboxyl groups per molecule, acid anhydrides of the compounds and esterified products of the compounds. The alicyclic structures are preferably mainly 4- to 6-membered ring. Examples of alicyclic polybasic acids include alicyclic polyvalent carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; anhydrides of the alicyclic polyvalent carboxylic acids; and $C_{1-4}$ lower alkyl esters of the alicyclic polyvalent carboxylic acids. Those alicyclic polybasic acids can be used either alone or in combination of two or more. As the alicyclic polybasic acids, use of 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid and 4-cyclohexene-1,2-dicarboxylic anhydride is preferred from the viewpoint of smoothness of resulting coating film. Of these, it is particularly preferred to use 1,2-cyclohexanedicarboxylic acid and/or 1,2-cyclohexanedicarboxylic anhydride.

The aromatic polybasic acid generally include aromatic compounds having at least two carboxyl groups per molecule, acid anhydrides of the aromatic compounds and esterified products of the aromatic compounds, for example, aromatic polyvalent carboxylic acid such as phthalic acid, isophthalic acid, terephthalic acid, naphthalenedicarboxylic acid, 4,4'-biphenyldicarboxylic acid, trimellitic acid and pyromellitic acid; anhydrides of those aromatic polyvalent carboxylic acids; and esterified products of those aromatic polyvalent carboxylic acids with $C_{1-4}$ lower alkyl can be named. Above aromatic polybasic acids can be used either alone or in combination of two or more. Those aromatic polybasic acids can be used either alone or in combination of two or more. As the aromatic polybasic acid, use of phthalic acid, phthalic anhydride, isophthalic acid, trimellitic acid or trimellitic anhydride is preferred.

Acid components other than the above aliphatic polybasic acid, alicyclic polybasic acid and aromatic polybasic acid can also be used, without any particular limitation. For example, fatty acids such as coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rape seed oil fatty acid, castor oil fatty acid, dehydrated castor oil fatty acid and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid and 10-phenyloctadecanoic acid; and hydroxycarboxylic acids such as lactic acid, 3-hydroxybutanoic acid and 3-hydroxy-4-ethoxybenzoic acid can be used. These acid components can be used either alone or in combination of two or more.

As the alcohol component, polyhydric alcohol having at least two hydroxyl groups per molecule can be conveniently used, examples of which include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A and hydrogenated bisphenol F; polylactonediols formed by adding lactones such as ε-caprolactone to these dihydric alcohols; ester diols such as bis(hydroxyethyl)terephthalate; polyether diols such as alkylene oxide adduct of bisphenol A, polyethylene glycol, polypropylene glycol and polybutylene glycol; tri- or higher-hydric alcohols such as glycerine, trimethylolethane, trimethylolpropane, diglycerine, triglycerine, 1,2,6-hexanetriol, pentaerythritol, dipentaerythritol, tris(2-hydroxyethyl)isocyanuric acid, sorbitol and mannitol; and polylactonepolyols formed by adding lactones such as ε-caprolactone to these tri- or higher-hydric alcohols.

Alcohol component other than the above polyhydric alcohols can also be used without any particular limitation, examples of which include monoalcohols such as methanol, ethanol, propyl alcohol, butyl alcohol, stearyl alcohol and 2-phenoxyethanol; and alcoholic compounds obtained by reaction of monoepoxy compounds such as propylene oxide, butylene oxide, CARDURA E10 (tradename, HEXION Specialty Chemicals Co., a glycidyl ester of synthetic highly branched saturated fatty acid) with acids.

Production method of hydroxyl-containing polyester resin (C2) is not critical, but ordinary methods can be used. For example, such hydroxyl-containing polyester resin can be prepared by heating the above-described acid component and alcohol component in gaseous nitrogen current, at temperatures ranging about 150- about 250° C., for about 5-10 hours to carry out an esterification reaction or ester-interchange reaction of the acid component with the alcohol component.

In the occasion of the esterification or ester-interchange reaction of the acid component with the alcohol component, they may be added to a reactor all at once, or either one of them or both may be added as divided portions. After synthesizing a hydroxyl-containing polyester resin first, the resulting hydroxyl-containing polyester resin may be reacted with an acid anhydride to be half-esterified, whereby forming a carboxyl- and hydroxyl-containing polyester resin. Again, a carboxyl-containing polyester resin may be synthesized first, to which then above alcohol component is added to provide a hydroxyl-containing polyester resin.

In the occasion of the esterification or ester-interchange reaction, per se known catalyst such as dibutyltin oxide, antimony trioxide, zinc acetate, manganese acetate, cobalt acetate, calcium acetate, lead acetate, tetrabutyl titanate, tetraisopropyl titanate and the like may be used for promoting the reaction.

The hydroxyl-containing polyester resin (C2) may also be modified, during or after preparation of the resin, with fatty acid, monoepoxy compound, polyisocyanate compound or the like. As the fatty acid, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rape seed oil fatty acid, castor oil fatty acid, dehydrated castor oil fatty acid and safflower oil fatty acid can be named; as the monoepoxy compound, for example, CARDURA E10 (tradename, HEXION Specialty Chemicals Co., a glycidyl ester of synthetic highly branched saturated fatty acid) can be favorably used; and as the polyisocyanate compound, for example, aliphatic diisocyanates such as lysine diisocyanate, hexamethylene diisocyanate and trimethylhexane diisocyanate; alicyclic diisocyanates such as hydrogenated xylylene diisocyanate, isophorone diisocyanate, methylcyclohexane-2,4-diisocyanate, methylcyclohexane-2,6-diisocyanate, 4,4'-methylenebis(cyclohexylisocyanate) and 1,3-(isocyanatomethyl)cyclohexane; aromatic diisocyanates such as tolylene diisocyanate, xylylene diisocyanate and diphenylmethane diisocyanate; organic polyisocyanates themselves such as tri- or higher-valent polyisocyanates like lysine triisocyanate; adducts of each of these organic polyisocyanates with polyhydric alcohol, low molecular weight polyester resin, water or the like; cyclized polymers between each of these organic polyisocyanates (e.g., isocyanurates) and biuret type adducts can be named. These polyisocyanate compounds can be used either alone or in combination of two or more.

In the hydroxyl-containing polyester resin (C2), preferably the content of alicyclic polybasic acid in the starting acid component lies within a range of generally 20-100 mol %, in particular, 25-95 mol %, inter alia, 30-90 mol %, based on the total amount of the acid component, from the viewpoint of excellent appearance of resulting coating film. Particularly for excellent smoothness of the coating film, 1,2-cyclohexanedicarboxylic acid and/or 1,2-cyclohexane-dicarboxylic anhydride are preferred as the alicyclic polybasic acid.

The hydroxyl-containing polyester resin (C2) preferably has a hydroxyl value within a range of generally 10-200 mgKOH/g, in particular, 20-180 mgKOH/g, inter alia, 30-160 mgKOH/g. Where the hydroxyl-containing polyester resin (C2) has carboxyl groups, it preferably has an acid value within a range of generally 5-150 mgKOH/g, in particular, 10-100 mgKOH/g, inter alia, 20-70 mgKOH/g. Furthermore, the hydroxyl-containing polyester resin (C2) preferably has a weight-average molecular weight within a range of generally 500-100,000, in particular, 1,000-50,000, inter alia, 1,500-20,000.

The blend ratio of the hydroxyl-containing resin (C) in the paint composition of the present invention is, based on the combined amount of the hydroxyl-containing resin (C) and later described curing agent (D), preferably within a range of generally 30-95 mass %, in particular, 50-90 mass %, inter alia, 60-80 mass %.

In particular, when the paint composition of the present invention contains hydroxyl-containing acrylic resin (C1) as the hydroxyl-containing resin (C), the blend ratio of the hydroxyl-containing acrylic resin (C1) preferably is within a range of generally 2-70 mass %, in particular, 10-55 mass %, inter alia, 20-45 mass %, based on the combined amount of the hydroxyl-containing resin (C) and curing agent (D).

Also when the paint composition of the present invention contains hydroxyl-containing polyester resin (C2) as the hydroxyl-containing resin (C), the blend ratio of the hydroxyl containing polyester resin (C2) preferably is within a range of generally 2-70 mass %, in particular, 5-55 mass %, inter alia, 10-45 mass %, based on the combined amount of the hydroxyl-containing resin (C) and curing agent (D).

As the curing agent (D), compounds which are reactable with crosslinkable functional groups in the base resin, such as hydroxyl, carboxyl, epoxy and the like, can be used, for example, amino resin (D1), polyisocyanate compound (D1), blocked polyisocyanate compound (D3), epoxy-containing compound, carboxyl-containing compound and carbodiimido-containing compound, which can be used either alone or in combination of two or more. Of these, amino resin (D1), polyisocyanate compound (D2) and blocked polyisocyanate compound (D3) which are reactable with hydroxyl group; and carbodiimido-containing compound which is reactable with carboxyl group, in particular, amino resin (D1), polyisocyanate compound (D2) and blocked polyisocyanate compound (D3) are suitable.

When the paint composition of the invention is water-based, it preferably contains as the curing agent (D) amino resin (D1) and/or blocked polyisocyanate compound (D3), and when the paint composition of the invention is organic solvent-based, it preferably contains as the curing agent (D) amino resin (D1) and/or polyisocyanate compound (D2).

Examples of the amino resin (D1) include partially or completely methylolated amino resins obtained through reaction of such amino component as melamine, urea, benzoguanamine, acetoguanamine, steroguanamine, spiroguanamine or dicyandiamide with aldehyde. As the aldehyde, formaldehyde, paraformaldehyde, acetaldehyde, benzaldehyde and the like can be named. Also these methylolated amino resins whose methylol groups are partially or completely etherified with suitable alcohol can also be used, examples of the alcohol used for the etherification including methyl alcohol, ethyl alcohol, n-propyl alcohol, i-propyl alcohol, n-butyl alcohol, i-butyl alcohol, 2-ethylbutanol and 2-ethylhexanol.

As the amino resin (D1), melamine resins are preferred, in particular, methyl etherified melamine resins, formed by partially or completely etherifying methylol groups in partially or completely methylolated melamine resins, with methyl alcohol; butyl etherified melamine resins formed by partially or completely etherifying methylol groups in partially or completely methylolated melamine resins, with butyl alcohol; and methyl-butyl mixed etherified melamine resins formed by partially or completely etherifying methylol groups of partially or completely methylolated melamine resins, with methyl alcohol and butyl alcohol; are preferred.

The melamine resin (D1) preferably has a weight-average molecular weight within a range of normally 400-5,000, in particular, 600-4,000, inter alia, 1,000-3,000.

As commercially available melamine resin (D1), for example, CYMEL 202, CYMEL 203, CYMEL 238, CYMEL 251, CYMEL 303, CYMEL 323, CYMEL 324, CYMEL 325, CYMEL 327, CYMEL 350, CYMEL 385, CYMEL 1156, CYMEL 1158, CYMEL 1116 and CYMEL 1130 (tradename, Nippon Cytec Industries, Inc.); U-VAN 120, U-VAN 20HS, U-VAN 20SE60, U-VAN 2021, U-VAN 2028 and U-VAN-28-60 (tradename, Mitsui Chemical Inc.) can be used.

Such melamine resins (D1) can be used either alone or in combination of two or more.

The polyisocyanate compound (D2) is a compound containing at least two isocyanate groups per molecule, examples of which include aliphatic polyisocyanates such as hexamethylene diisocyanate, trimethylhexamethylene diisocyanate, dimeric acid diisocyanate and lysine diisocyanate; and biuret type adducts and isocyanurate ring adducts of these polyisocyanates; alicyclic diisocyanates such as isophorone diisocyanate, 4,4'-methylenebis(cyclohexyl isocyanate), methylcyclohexane-2,4-diisocyanate, methylcyclohexane-2,6-diisocyanate, 1,3-di(isocyanatomethyl)cyclohexane, 1,4-di(isocyanatomethyl)-cyclohexane, 1,4-cyclohexane diisocyanate, 1,3-cyclopentane diisocyanate and 1,2-cyclohexane diisocyanate; and biuret type adducts and isocyanurate ring adducts of these polyisocyanates; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, m-phenylene diisocyanate, p-phenylene diisocyanate, 4,4'-biphenylene diisocyanate, 3,3'-dimethyl-4,4'-biphenylene diisocyanate, bis(4-isocyanatophenyl)-sulfone and isopropylidene-bis(4-phenyl isocyanate); and biuret type adducts and isocyanurate ring adducts of these polyisocyanates; polyisocyanates having at least three isocyanate groups per molecule, such as triphenylmethane-4,4',4"-triisocyanate, 1,3,5-triisocyanatobenzene, 2,4,6-triisocyanatotoluene and 4,4'-dimethyldiphenylmethane-2,2',5,5'-tetraisocyanate; and biuret type adducts and isocyanurate ring adducts of these polyisocyanates; urethanated adducts formed by reacting with hydroxyl groups of polyols such as ethylene glycol, propylene glycol, 1,4-butylene glycol, dimethylolpropionic acid, polyalkylene glycol, trimethylolpropane and hexanetriol, polyisocyanate compounds at a ratio to render the isocyanate groups excessive; and biuret type adducts and isocyanurate ring adducts of these polyisocyanates.

Blocked polyisocyanate compounds (D3) are usually obtained by adding a blocking agent to isocyanate groups of above polyisocyanate compounds (D2), from which the blocking agent dissociates when heated, to regenerate the isocyanate groups which can react with hydroxyl groups and the like. The dissociation temperature of such blocking agent preferably ranges 60-160° C., in particular, 70-140° C.

Examples of the blocking agent include phenols such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, α-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; alcohols such as benzyl alcohol, glycolic acid, methyl glycolate, ethyl glycolate, butyl glycolate, lactic acid, methyl lactate, ethyl lactate, butyl lactate, methylolurea, methylolmelamine, diacetone alcohol, 2-hydroxyethyl acrylate, 2-hydroxyethyl methacrylate and the like; oximes such as formamidoxime, acetamidoxime, acetoxime, methyl ethyl ketoxime, diacetylmonooxime, benzophenone-oxime, cyclohexane-oxime and the like; active methylenes such as dimethyl malonate, diethyl malonate, ethyl acetoacetate, methyl acetoacetate, acetylacetone and the like; mercaptans such as butyl mercaptan, t-butyl mercaptan, hexyl mercaptan, t-dodecyl mercaptan, 2-mercaptobenzothiazole, thiophenol, methylthiophenyl, ethylthiophenol and the like; acid amides such as acetanilide, acetanisidide, acetotoluide, acrylamide, methacrylamide, acetic acid amide, stearic acid amide, benzamide and the like; imides such as succinimide, phthalimide, maleimide and the like; amines such as diphenylamine, phenylnaphthylamine, xylidine, N-phenylxylidine, carbazole, aniline, naphthylamine, butylamine, dibutylamine, butylphenylamine and the like; imidazoles such as imidazole, 2-ethylimidazole and the like; ureas such as urea, thiourea, ethyleneurea, ethylenethiourea, diphenylurea and the like; carbamic acid esters such as phenyl N-phenylcarbamate; imines such as ethyleneimine, propyleneimine and the like; sulfurous acid salts such as sodium disulfite, potassium disulfite and the like; and azole compounds. As the azole compounds, pyrazole or pyrazole derivatives, such as pyrazole, 3,51-dimethylpyrazole, 3-methylpyrazole, 4-benzyl-3,5-dimethylpyrazole, 4-nitro-3,5-dimethylpyrazole, 4-bromo-3,5-dimethylpyrazole, 3-methyl-5-phenylpyrazole and the like; imidazole or imidazole derivatives such as imidazole, benzimidazole, 2-methylimidazole, 2-ethylimidazole, 2-phenylimidazole and the like; and imidazoline derivatives such as 2-methylimidazoline, 2-phenylimidazoline and the like can be named. As preferred blocking agent, oxime blocking agent, active methylene blocking agent, pyrazole or pyrazole derivatives can be used.

As the blocking agent, also hydroxycarboxylic acid having at least one each of hydroxyl group and carboxyl group, such as hydroxypivalic acid, dimethylolpropionic acid and the like can be used. Particularly when the paint composition of this invention is water-based, blocked polyisocyanate compound to which water dispersibility is imparted by blocking its isocyanate groups with above hydroxycarboxylic acid and neutralizing the carboxyl groups of the hydroxycarboxylic acid can be favorably used.

The use ratios among the pigment-dispersing resin (A), pigment (B), hydroxyl-containing resin (C) and curing agent (D) in the paint compositions of the present invention are not strictly limited. In general terms, however, they may be within the following ranges, per 100 mass parts of total solid resin content of the hydroxyl-containing resin (C) and the curing agent (D):

Pigment-dispersing resin (A): 0.5-30 mass parts, preferably 1-20 mass parts, inter alia, 2-10 mass parts,
Pigment (B): 2-70 mass parts, preferably 5-50 mass parts, inter alia, 8-40 mass parts,
Hydroxyl-containing resin (C): 40-90 mass parts, preferably 50-85 mass parts, inter alia, 60-80 mass parts.
Curing agent (D): 10-60 mass parts, preferably 15-50 mass parts, inter alia, 20-40 mass parts.

As the solvent used in the paint compositions of the present invention where necessary, water and/or organic solvent can be named. As the organic solvent, for example, those organic solvents as explained as being useful for producing the pigment dispersions, where necessary, can be used. In particular, water and hydrophobic solvent (E) are preferably contained as the solvent, when the paint compositions of the present invention are water-based.

The hydrophobic solvent (E) in the present invention is an organic solvent whose mass soluble in 100 g of 20° C. water is not more than 10 g, preferably not more than 5 g, inter alia, not more than 1 g. Examples of such solvent include hydrocarbon solvents such as rubber gasoline, mineral spirit, toluol, xylol and solvent naphtha; alcohol solvents such as 1-hexanol, 1-octanol, 2-octanol, 2-ethylhexanol, 1-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether and propylene glycol monophenyl ether; ester solvents such as n-butyl acetate, isobutyl acetate, isoamyl acetate, methylamyl acetate and ethylene glycol monobutyl ether acetate; and ketone solvents such as methyl isobutyl ketone, cyclohexanone, ethyl n-amyl ketone and diisobutyl ketone. These can be used either alone or in combination of two or more.

Of those, from the viewpoint of excellent appearance of resulting coating film, the hydrophobic solvent (E) is preferably an alcohol solvent, in particular $C_{7-14}$ alcohol solvent, for example, 1-octanol, 2-octanol, 2-ethyl-1-hexanol, ethylene glycol mono-2-ethylhexyl ether, propylene glycol mono-n-butyl ether and dipropylene glycol mono-n-butyl ether, can be favorably used.

Also when paint compositions of the present invention contain such hydrophobic solvent (E), the blend amount of the hydrophobic solvent (E) is preferably within a range of usually 2-70 mass parts, in particular, 11-60 mass parts, inter alia, 16-50 mass parts, per 100 mass parts of the combined solid content of the hydroxyl-containing resin (C) and curing agent (D) in the paint composition of the invention.

As the curing catalyst, when amino resin (D1) such as melamine resin is used as the curing agent (D), for example, sulfonic acid compound such as paratoluenesulfonic acid, dodecylbenzenesulfonic acid, dinonylnaphthalenesulfonic acid and the like, or amine-neutralized products of these sulfonic acids can be favorably used. Where polyisocyanate compound (D2) and/or blocked polyisocyanate compound (D3) are used as the curing agent (D), for example, organometal catalyst such as dibutyltin diacetate, dibutyltin dioctate, dibutyltin dilaurate and the like; and amines such as triethylamine, diethanolamine and the like can be favorably used.

Where paint compositions of the invention contains such curing catalyst, the blend amount of the curing catalyst is preferably within a range of usually 0.001-10 mass parts, in particular, 0.01-5 mass parts, inter alia, 0.05-2 mass parts, per 100 mass parts of the combined solid content of the hydroxyl-containing resin (C) and curing agent (D) in the paint composition of the invention.

The fine polymer particles are of a polymer which is not dissolved in paint compositions of the invention but is dispersed in the form of fine particles. Those having an average particle size within a range of normally 0.01-1 μm, in particular, 0.05-0.8 μm are preferred. While the fine polymer particles may or may not be internally crosslinked, internally crosslinked particles are preferred. As the fine polymer particles, for example, those per se known in the paint field as paint fluidity-regulating agent can be used.

As the ultraviolet absorber, for example, benzophenone, benzotriazole, cyanoacrylate, salicylate and anilide oxalate compounds can be named, and as the light stabilizer, for example, hindered amine compounds can be named.

As the thickener, for example, inorganic thickeners such as silicate, metal silicate, montmorillonite, organic montmorillonite and colloidal alumina; polyacrylic acid-derived thickeners such as copolymers of polyacrylic acid with (meth) acrylic acid esters and sodium polyacrylate; association type thickeners having hydrophilic moiety and hydrophobic moiety per molecules, which exhibit effective thickening action as the hydrophobic moiety is adsorbed onto surfaces of pigment or emulsion particles in the composition, or the hydrophobic moieties mutually associate; cellulose derivatives-derived thickeners such as carboxymethyl cellulose, methyl cellulose and hydroxyethyl cellulose; protein-derived thickeners such as casein, sodium caseinate and ammonium caseinate; alginic acid-derived thickeners such as sodium alginate; polyvinyl-derived thickeners such as polyvinyl alcohol, polyvinylpyrrolidone and polyvinylbenzyl ether copolymer; polyether-derived thickeners such as polyether dialkyl ester, polyether dialkyl ether and polyether epoxy-modified product; maleic anhydride copolymer-derived thickeners such as partial esters of vinylmethyl ether-maleic anhydride copolymers; and polyamide-derived thickeners such as polyamide amine salts can be named. These thickeners can be used either alone or in combination of two or more.

Examples of commercially available polyacrylic acid-derived thickeners include PRIMAL ACE-60, PRIMAL TT-615 and PRIMAL RM-5 (tradename, Rhom & Haas Company); SN Thickener 613, SN Thickener 618, SN Thickener 630, SN Thickener 634 and SN Thickener 636 (tradename, SAN NOPCO, Ltd.).

Examples of commercially available association type thickener include UH-420, UH-450, UH-462, UH-472, UH-540, UH-752, UH-756VF and UH-814N (tradename, ADEKA Corporation); PRIMAL RM-8W, PRIMAL RM-825, PRIMAL RM-2020 NPR, PRIMAL RM-12W and PRIMAL SCT-275 (tradename, Rhom & Haas Company); and SN Thickener 612, SN Thickener 621N, SN Thickener 625N, SN Thickener 627N and SN Thickener 660T (tradename, SAN NOPCO, Ltd.).

According to the invention, use of those polyacrylic acid-derived thickener and/or association type thickener as the thickener is preferred, in particular, association type thickener being preferred. It is even more advantageous to use urethane association type thickener having terminal hydrophobic group and at least one urethane bond in the molecular chain. Examples of commercially available urethane association type thickener that are particularly preferred include UH-420, UH-462, UH-472, UH-540, UH-756 VF, UH-814N, SN Thickener 612, SN Thickener 621N, SN Thickener 625N, SN Thickener 627N and SN Thickener 660T (tradenames, all manufactured by ADEKA Corporation).

When paint compositions of the present invention contain above thickeners, the content of the thickener in a composition of the invention is preferably within a range of usually 0.01-10 mass parts, in particular, 0.05-3 mass parts, inter alia, 0.1-2 mass parts, per 100 mass parts in total of the hydroxy-containing resin (C) and curing agent (D). Also when the above association type thickener is contained as the thickener, its content in the composition preferably is within a range of usually 0.01-10 mass parts, in particular, 0.05-2 mass parts, inter alia, 0.1-1 mass part, per 100 mass parts in total of the hydroxyl containing resin (C) and curing agent (D).

Coating Object

Objects which can be coated with the paint compositions of the present invention is subject to no particular limitation and, for example, outer panels of car bodies such as of automobiles, trucks, motorcycles and buses; car parts; outer panels of household appliances such as mobile phones and audio instruments can be named. Of those, outer panels of car bodies and car parts are suitable.

Materials of such coating objects are not particularly limited. For example, metallic materials such as iron, aluminium, brass, copper, stainless steel, tin plate, zinc-plated steel, alloyed zinc (Zn—Al, Zn—Ni, Zn—Fe and the like), and plated steel; plastic materials such as resins, e.g., polyethylene resin, polypropylene resin, acrylonitrile-butadiene-styrene (ABS) resin, polyamide resin, acrylic resin, vinylidene chloride resin, polycarbonate resin, polyurethane resin and epoxy resin, and various FRP's; inorganic materials such as glass, cement and concrete; wood; and fibrous materials (paper, cloth and the like) can be used. Of those, metallic materials and plastic materials are preferred.

Above coating objects may be metallic materials or metallic surfaces such as of car bodies made thereof, onto which surface treatment such as phosphate treatment, chromate treatment, complex oxide treatment or the like has been given, or coating film has been further formed thereon.

As such film-coated objects, those formed by surface treating substrates and applying undercoat thereon; or by further applying on the undercoat an intermediate coat; can be used.

Paint compositions of the present invention can form coating film of excellent appearance and water resistance, and hence can be favorably used as top coat paint for automobiles.

When a paint composition of the present invention is used as a top coat paint for automobiles, typical examples of the objects to be coated are chemical conversion treated sheet steel on which undercoat is formed by electrocoating and further an intermediate paint is applied on the undercoat where necessary; various plastic materials (where necessary, advancedly surface-treated, primer-coated and intermediate coated); and composite materials which are combination of the foregoing.

As the paint used for the above electrocoating, either of anionic electrodeposition paint and cationic electrodeposition paint can be used, while cationic electrodeposition paint exhibiting good corrosion resistance is desirable. As the cationic electrodeposition paint, those known per se can be used, for example, one containing base resin having hydroxyl groups and cationic groups and curing agent such as blocked polyisocyanate compound as the resin component can be conveniently used.

Also as the intermediate paint, thermosetting type intermediate paint known per se can be used, specific examples including such paints comprising base resins such as alkyd resin, polyester resin, acrylic resin, urethane resin and the like, in suitable combination with curing agents such as amino resin, polyisocyanate compound, blocked polyisocyanate compound and the like which contain the groups reactable with the reactive functional groups contained in the base resins. As the intermediate paint, high-solid paint, water-based paint or powder paint using less organic solvent are preferred, from the viewpoint of environmental preservation and source saving.

Coating Method

Method for coating such objects as above-described with paint compositions of the present invention is subject to no particular limitation and, for example, air spray coating, airless spray coating, rotary atomizing coating, curtain flow coating and the like may be used. Wet coating films can be formed by these means. These coating methods may be practiced under impression of static electricity, where necessary, and rotary atomizing system electrostatic coating and air spray system electrostatic coating are preferred, the former being particularly preferred. The use amount of a paint composition of the present invention is variable depending on, e.g., intended utility of the coated object, while such an amount as will make the cured film thickness normally 5-50 µm, in particular, 8-40 µm, inter alia, 10-30 µm, is preferred.

Curing of wet coating film can be effected by heating after applying a paint composition of the present invention onto a coating object. Heating can be given by per se known heating means, for example, drying oven such as hot air oven, electric oven or infrared ray induction heating oven. Suitable heating temperature normally ranges 80-180° C., preferably 100-160° C. While the heating time is not critical, it can be normally around 20-40 minutes.

Paint compositions of the present invention can be favorably used as paints for automobiles, in particular, as base coat paint in a coating method in which the object is applied with a base coat paint containing effect pigment and/or coloring pigment and then applied with a clear paint.

In the occasions of using the paint compositions of the present invention as the base coat paint, for example, a paint composition of the invention is applied onto an electrocoated and/or intermediate coated object and, without curing the formed coating film, a clear paint is applied onto the uncured coating film, followed by curing the uncured coating film and the clear coating film simultaneously by heating. Using such 2-coat-1-bake system, multilayer coating film can be formed. The "uncured coating film" includes set-to-touch film and dry-to-touch film.

In case of applying a paint composition of the present invention by 2-coat-1-bake system, the composition is suitably coated to provide a dry film thickness within a range of normally 5-40 µm, in particular, 10-30 µm, inter alia, 10-20 µm; and the clear paint is suitably applied to a dry film thickness within a range of normally 10-80 µm, in particular, 15-60 µm. When the paint composition of the invention is water-based, preferably the composition after application is preheated under such heating condition as will not substantially cure the coating film, for prevention of occurrence of defect in coating film such as cissing. The preheating temperature normally ranges room temperature—100° C., preferably 40-90° C., and the preheating time can range normally 30 seconds—15 minutes, preferably 1-5 minutes. Furthermore, after applying the clear paint, an interval at room temperature of normally 1-60 minutes, preferably 3-20 minutes, may be taken or preheating at about 40-80° C. for 1-60 minutes may be given, where necessary.

Curing of the paint composition of the invention and the clear paint can be effected by heating means known per se as aforesaid. Specifically, for example, it is suitable to simultaneously cure the two films, by heating at temperatures of normally about 80- about 180° C., preferably about 100- about 160° C., for around 10-40 minutes.

It is also possible to form multilayer coating film by 3-coat-1-bake system, in which an intermediate paint is applied onto an object; without curing the formed coating film a coating composition of the present invention as a base coat paint is applied onto the uncured intermediate coating film; without curing the formed coating film a clear paint is applied onto the uncured base coating film, to form a clear coating film; and the three layers of the intermediate coating film, base coating film and clear coating film are simultaneously cured by heating.

As the clear paint, those known per se, which are customarily used, for example, for coating automobile bodies, can be used. Specifically, for example, organic solvent-based thermosetting paint, water-based thermosetting paint, thermosetting powder paint, thermosetting water dispersion liquid (slurry) paint and the like can be named, which contain as resin component a base resin such as acrylic resin, polyester resin, alkyd resin, urethane resin, epoxy resin, fluorine-containing resin and the like, having crosslinkable functional groups such as hydroxyl, carboxyl, epoxy and silanol groups; and crosslinking agent such as melamine resin, urea resin, optionally blocked polyisocyanate compound, carboxyl-containing compound or resin, epoxy-containing compound or resin. Of these, thermosetting paint comprising hydroxyl-containing resin and melamine resin, thermosetting paint comprising carboxyl-containing resin and epoxy-containing resin, and thermosetting paint comprising hydroxyl-containing resin and optionally blocked polyisocyanate compound, are preferred.

Desirable blend ratio of the base resin and crosslinking agent is such that the base resin component is normally 50-90 mass %, in particular, 60-80 mass %, and the crosslinking agent component, normally 20-40 mass %, based on the sum of the two components.

The clear paint may be one-package type or may be two-package type like two-package type urethane resin paint.

The clear paint may also contain, where necessary, coloring pigment, effect pigment, dye and the like to an extent not interfering with transparency of the paint, and furthermore can suitably contain extender, ultraviolet absorber, light stabilizer, defoamer, thickener, rust proofing agent, surface regulating agent and the like.

EXAMPLES

Hereinafter the invention is explained more specifically, referring to working Examples and Comparative Examples, it being understood that the invention is not limited to these Examples only. "Part" and "%" appearing hereafter are invariably by mass.

Production of Polymerizable Unsaturated Monomer (m-6) Having Divalent Group Represented by the General Formula (I) and Phosphoric Acid Group Production Example 1

A reactor was charged with 358 parts of PLACCEL FM2D (tradename, Daicel Chemical Industries, Ltd., a monomer formed by adding 2 mols of ε-caprolactone per mol of 2-hydroxyethyl methacrylate) and into which 63.9 parts of phosphorus pentoxide was added little by little at 50-60° C., while introducing dry air into the reaction liquid by bubbling. After completion of the addition, the reaction system was aged at 60° C. for 5 hours, followed by addition of 9.0 parts of deionized water. Further aging the system at 80° C. for 5 hours, polymerizable unsaturated monomer (m-6-1) was obtained.

Production Example 2

A reactor was charged with 244 parts of PLACCEL FM1 (tradename, Daicel Chemical Industries, Ltd., a monomer formed by adding 1 mol of ε-caprolactone per mol of 2-hydroxyethyl methacrylate), 1.44 parts of stannic chloride and 0.18 part of hydroquinone monomethyl ether (MEHQ). After substituting the inside space of the reactor with nitrogen, 116 parts of propylene oxide was introduced under elevated pressure while the temperature was maintained at no higher than 40° C., followed by an hour's aging.

Successively, 63.9 parts of phosphorus pentoxide was added little by little at 50-60° C., while introducing dry air into the reaction liquid by bubbling. After completion of the addition, the reaction system was aged at 60° C. for 5 hours, followed by addition of 9.0 parts of ion-exchange water.

Further aging the system at 80° C. for 5 hours, polymerizable unsaturated monomer (m-6-2) was obtained.

Production Example 3

A reactor was charged with 398 parts of BLENMER PE-200 (tradename, NOF Corporation, polyethylene glycol monomethacrylate), 114 parts of ε-caprolactone, 0.008 part of monobutyltin oxide 0.3 part of MEHQ, and temperature-raising was started while introducing dry air into the reaction liquid by bubbling. The reaction temperature was maintained constantly at 120° C. The content in the reactor was sampled, whereby to quantitate the amount of unreacted ε-caprolactone by means of gas chromatograph, and the reaction mixture was cooled when the conversion exceeded 95%.

Successively, 63.9 parts of phosphorus pentoxide was added little by little at 50-60° C. After completion of the addition, the reaction system was aged at 60° C. for 5 hours, followed by addition of 9.0 parts of deionized water. Further aging the system at 80° C. for 5 hours, polymerizable unsaturated monomer (m-6-3) was obtained.

Production Example 4

A reactor was charged with 115 parts of HEAA (tradename, KOHJIN Co., Ltd., N-hydroxyethylacrylamide), 228 parts of ε-caprolactone, 0.00686 part of monobutyltin oxide and 0.258 part of MEHQ, and temperature-raising was started while introducing dry air into the reaction liquid by bubbling. The reaction temperature was maintained constantly at 120° C. The content in the reactor was sampled, whereby to quantitate the amount of unreacted ε-caprolactone by means of gas chromatograph, and the reaction mixture was cooled when the conversion exceeded 95%.

Successively, 63.9 parts of phosphorus pentoxide was added little by little at 50-60° C., while introducing dry air into the reaction liquid by bubbling. After completion of the addition, the reaction system was aged at 60° C. for 5 hours, followed by addition of 9.0 parts of deionized water. Further aging the system at 80° C. for 5 hours, polymerizable unsaturated monomer (m-6-4) was obtained.

Production of Polymerizable Unsaturated Monomer (m-8) having Divalent Group Represented by the General Formula (I) and Sulfonic Acid Group Production Example 5

A reactor was charged with 358 parts of PLACCEL FM2D (tradename, Daicel Chemical Industries, Ltd., a monomer formed by adding 2 mols of ε-caprolactone per mol of 2-hydroxyethyl methacrylate), which was reacted with 115 parts of methanesulfonyl chloride in the concurrent presence of pyridine at 0° C. for 10 hours, while introducing dry air into the reaction liquid by bubbling. The resulting mixture was washed with water. Then 1,000 parts of 40% aqueous sodium sulfite solution was added and violently stirred to cause their reaction, followed by neutralization with sulfuric acid. The resulting mixture was washed with water to provide polymerizable unsaturated monomer (m-8-1).

Production of Pigment-dispersing Resin (A)

Example 1

A reactor equipped with a thermometer, thermostat, stirrer, reflux condenser, nitrogen inlet pipe and dropping device was charged with 120 parts of dipropylene glycol dimethyl ether (which contained no hydroxyl group and had a solubility in 20° C. water of 100 mass % or more), which was heated to 110° C. While maintaining the same temperature, 106 parts of a monomeric mixture composed of 30 parts of PLACCEL FM2D (tradename, Daicel Chemical Industries, Ltd., a monomer formed by adding 2 mols of ε-caprolactone per mol of 2-hydroxyethyl methacrylate), 10 parts of Light Ester P-1M (tradename, Kyoeisha Chemical Co., acid phosphoxyethyl methacrylate), 30 parts of styrene, 30 parts of cyclohexyl methacrylate and 6 parts of t-butyl peroxy-2-ethylhexanoate was dropped into the reactor, consuming 4 hours, followed by an hour's aging under stirring. Thereafter a polymerization initiator solution composed of 1 part of t-butyl peroxy-2-ethylhexanoate and 30 parts of dipropylene glycol dimethyl ether was added dropwise over an hour, followed by an hour's aging under stirring. Thus a pigment-dispersing resin solution (A-1) having a solid concentration of 39% was obtained. The resulting pigment-dispersing resin had an acid value of 125 mgKOH/g, hydroxyl value of 45 mgKOH/g and a number-average molecular weight of 20,000.

Examples 2-19, Comparative Examples 1-4

Example 1 was repeated except that the blend ratios were changed to those as shown in the following Table 1, to produce pigment-dispersing resin solutions each having a solid concentration of 39%, (A-2) to (A-23). The acid value, hydroxyl value and number-average molecular weight of resulting pigment-dispersing resin solutions (A-2) to (A-23) are shown in the following Table 1, concurrently with those values of the pigment-dispersing resin solution (A-1) of Example 1. In the Table 1, the amount of each of the polymerizable unsaturated monomer is that of the solid content.

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Pigment-dispersing resin solution | | | A-1 | A-2 | A-3 | A-4 | A-5 | A-6 | A-7 | A-8 | A-9 | A-10 | A-11 | A-12 |
| Dipropylene glycol dimethyl ether | | | 120 | | | | | | | | | | | |
| N-methyl-2-pyrrolidone (note 1) | | | | 120 | 120 | 120 | 120 | 120 | 120 | 120 | 120 | 120 | 120 | 120 |
| N,N-dimethyl-β-methoxypropionamide (note 2) | | | | | | | | | | | | | | |
| N,N-dimethyl-β-octyxypropionamide (note 3) | | | | | | | | | | | | | | |
| Dibutyl ether (note 4) | | | | | | | | | | | | | | |
| Propylene glycol monomethyl ether (note 5) | | | | | | | | | | | | | | |
| Monomeric mixture | monomer (m-1) | PLACCEL FM2D | 30 | 30 | 30 | | 30 | 25 | 30 | 10 | | | | |
| | | PLACCEL FM3 (note 6) | | | | 40 | | | | | | | | |
| | monomer (m-2) | Light Ester P-1M | 10 | 30 | 25 | 30 | | | | | | | | |
| | | Phosmer PE (note 7) | | | | | 40 | | | | | | | |
| | | Phosmer PP (note 8) | | | | | | 55 | | | | | | |
| | monomer | 2-acrylamide-2- | | | | | | | 28 | | | | | |

TABLE 1-continued

| | | | | | | | | | | | | | | |
|---|---|---|---|---|---|---|---|---|---|---|---|---|---|---|
| | (m-4) | methylpropane-sulfonic acid | | | | | | | | | | | | |
| | monomer (m-6) | monomer (m-6-1) | | | | | | | | 40 | 40 | | | |
| | | monomer (m-6-2) | | | | | | | | | | 35 | | |
| | | monomer (m-6-3) | | | | | | | | | | | 55 | |
| | | monomer (m-6-4) | | | | | | | | | | | | 40 |
| | monomer (m-8) | monomer (m-8-1) | | | | | | | | | | | | |
| | | styrene | 30 | 30 | 25 | 20 | 15 | 15 | 22 | 30 | 35 | 35 | 30 | 35 |
| | | 2-ethylhexyl acrylate | | | 10 | | | | | | | 5 | | |
| | | lauryl methacrylate | | | | | 10 | 5 | | 20 | | 5 | | |
| | | cyclohexyl methacrylate | 30 | 10 | 10 | | 5 | | | 10 | 10 | 5 | | 10 |
| | | n-butyl acrylate | | | | | | | | | | | | |
| | | 2-hydroxyethyl acrylate | | | | | 5 | 5 | | 10 | 15 | 15 | 15 | 15 |
| | | t-butyl peroxy-2-ethylhexanoate | 6 | 6 | 6 | 6 | 6 | 6 | 3 | 6 | 6 | 6 | 6 | 6 |
| Polymerization initiator solution | | dipropylene glycol dimethyl ether | 30 | | | | | | | | | | | |
| | | N-methyl-2-pyrrolidone (note 1) | | 30 | 30 | 30 | 30 | 30 | 30 | 30 | 30 | 30 | 30 | 30 |
| | | N,N-dimethyl-β-methoxypropionamide (note 2) | | | | | | | | | | | | |
| | | N,N-dimethyl-β-octoxypropionamide (note 3) | | | | | | | | | | | | |
| | | dibutyl ether (note 4) | | | | | | | | | | | | |
| | | propylene glycol monomethyl ether (note 5) | | | | | | | | | | | | |
| | | t-butyl peroxy-2-ethylhexanoate | 1 | 1 | 1 | 1 | 1 | 1 | 1 | 1 | 1 | 1 | 1 | 1 |
| Solid concentration (mass %) | | | 39 | 39 | 39 | 39 | 39 | 39 | 39 | 39 | 39 | 39 | 39 | 39 |
| Acid value (mgKOH/g) | | | 125 | 125 | 105 | 125 | 119 | 130 | 72 | 98 | 98 | 98 | 100 | 102 |
| Hydroxyl value (mgKOH/g) | | | 45 | 45 | 45 | 45 | 68 | 60 | 45 | 61 | 69 | 69 | 69 | 69 |
| Number-average molecular weigh ($\times 10^4$) | | | 2 | 2 | 2 | 2 | 2 | 2 | 2 | 2 | 2 | 2 | 2 | 2 |

| | | | Example | | | | | | | Comparative Example | | | |
|---|---|---|---|---|---|---|---|---|---|---|---|---|---|
| | | | 13 | 14 | 15 | 16 | 17 | 18 | 19 | 1 | 2 | 3 | 4 |
| Pigment-dispersing resin solution | | | A-13 | A-14 | A-15 | A-16 | A-17 | A-18 | A-19 | A-20 | A-21 | A-22 | A-23 |
| Dipropylene glycol dimethyl ether | | | | 20 | | | | | | | | | |
| N-methyl-2-pyrrolidone (note 1) | | | 120 | 100 | 100 | 120 | 120 | 120 | 120 | | | | |
| N,N-dimethyl-β-methoxypropionamide (note 2) | | | | | 20 | | | | | | | | |
| N,N-dimethyl-β-octoxypropionamide (note 3) | | | | | | | | | | 120 | | | |
| Dibutyl ether (note 4) | | | | | | | | | | | 120 | | |
| Propylene glycol monomethyl ether (note 5) | | | | | | | | | | | | 120 | 120 |
| Monomeric mixture | monomer (m-1) | PLACCEL FM2D | | 30 | 30 | 30 | 10 | 10 | 10 | 30 | 30 | 30 | |
| | | PLACCEL FM3 (note 6) | 5 | | | | | | | | | | |
| | monomer (m-2) | Light Ester P-1M | | | 30 | 30 | 6 | | | 30 | 30 | 15 | |
| | | Phosmer PE (note 7) | | | | | | | | | | | |
| | | Phosmer PP (note 8) | | | | | | | | | | | |
| | monomer (m-4) | 2-acrylamide-2-methylpropane-sulfonic acid | | | | | | | | | | | |
| | monomer (m-6) | monomer (m-6-1) | | | | | 40 | 40 | 40 | | | | 40 |
| | | monomer (m-6-2) | | | | | | | | | | | |
| | | monomer (m-6-3) | | | | | | | | | | | |
| | | monomer (m-6-4) | | | | | | | | | | | |
| | monomer (m-8) | monomer (m-8-1) | 57 | | | | | | | | | | |
| | | styrene | 23 | 30 | 30 | 40 | 7 | | | 30 | 25 | 20 | 25 |
| | | 2-ethylhexyl acrylate | | | | | 23 | 30 | | 10 | 10 | | 10 |
| | | lauryl methacrylate | | | | 9 | | 5 | | | 5 | 30 | |
| | | cyclohexyl methacrylate | 5 | 10 | 10 | 5 | 10 | 5 | | | | 5 | 10 |
| | | n-butyl acrylate | | | | | | | 40 | | | | |
| | | 2-hydroxyethyl acrylate | 10 | | | 10 | 10 | 10 | 10 | | | | 15 |
| | | t-butyl peroxy-2-ethylhexanoate | 6 | 6 | 6 | 4 | 6 | 6 | 6 | 6 | 6 | 6 | 6 |
| Polymerization initiator solution | | dipropylene glycol dimethyl ether | | 3 | | | | | | | | | |
| | | N-methyl-2-pyrrolidone | 30 | 27 | 27 | 30 | 30 | 30 | 30 | | | | |
| | | N,N-dimethyl-β-methoxypropionamide (note 2) | | | | 3 | | | | | | | |
| | | N,N-dimethyl-β-octoxypropionamide (note 3) | | | | | | | | 30 | | | |
| | | dibutyl ether (note 4) | | | | | | | | | 30 | | |
| | | propylene glycol monomethyl ether (note 5) | | | | | | | | | | 30 | 30 |
| | | t-butyl peroxy-2-ethylhexanoate | 1 | 1 | 1 | 1 | 1 | 1 | 1 | 1 | 1 | 1 | 1 |

TABLE 1-continued

| | | | | | | | | | | | |
|---|---|---|---|---|---|---|---|---|---|---|---|
| Solid concentration (mass %) | 39 | 39 | 39 | 39 | 39 | 39 | 39 | 39 | 39 | 39 | 39 |
| Acid value (mgKOH/g) | 71 | 125 | 125 | 25 | 98 | 98 | 98 | 125 | 125 | 63 | 98 |
| Hydroxyl value (mgKOH/g) | 52 | 45 | 45 | 90 | 61 | 61 | 61 | 45 | 45 | 45 | 69 |
| Number-average molecular weigh ($\times 10^4$) | 2 | 2 | 2 | 2 | 2 | 2 | 2 | 2 | 2 | 2 | 2 |

(note 1) N-methyl-2-pyrrolidone: a solvent containing no hydroxyl group and having a solubility in 20° C. water of at least 100 mass %,
(note 2) N,N-dimethyl-β-methoxypropionamide: a solvent containing no hydroxyl group and having a solubility in 20° C. water of at least 100 mass %,
(note 3) N,N-dimethyl-β-octoxypropionamide: a solvent containing no hydroxyl group and having a solubility in 20° C. water less than 100 mass %,
(note 4) dibutyl ether: a solvent containing no hydroxyl group and having a solubility in 20° C. water less than 100 mass %,
(note 5) propylene glycol monomethyl ether: a solvent containing hydroxyl group and having a solubility in 20° C. water of at least 100 mass %,
(note 6) PLACCEL FM-3: tradename, Daicel Chemical Industries, Ltd., a monomer formed by adding 3 mols of ε-caprolactone per mol of 2-hydroxyethyl methacrylate,
(note 7) Phosmer PE: tradename, Uni-Chemical Co., acid phospoxypolyoxyethylene glycol monomethacrylate,
(note 8) Phosmer PP: tradename, Uni-Chemical Co., acid phoshoxypolyoxypropylene glycol monomethacrylate Production of Hydroxyl-containing Acrylic Resin (C1)

Production Example 6

A reactor equipped with a thermometer, thermostat, stirrer, reflux condenser, nitrogen-inlet pipe and dropping device was charged with 130 parts of deionized water and 0.52 part of AQUALON KH-10 (note 9) which were stirred and mixed in gaseous nitrogen current. The temperature was raised to 80° C., and then 1% of the total amount of a later specified monomeric emulsion (1) and 5.3 parts of 6% aqueous ammonium persulfate solution were introduced into the reactor and kept at 80° C. for 15 minutes. Then the remainder of the monomeric emulsion (1) was dropped into the reactor which was maintained at the same temperature, over 3 hours, followed by an hour's aging. Thereafter a monomeric emulsion (2) as specified later was added dropwise over an hour, aged for an hour, and the reaction mixture was cooled to 30° C. under gradual addition of 40 parts of an aqueous 5% dimethylethanolamine solution into the reactor. The content was discharged while being filtered through Nylon cloth, mesh size of 100, to provide a water-dispersible, hydroxyl-containing acrylic resin (C1-1) having an average particle size of 100 nm [as measured with a submicron particle size distribution measuring device, COULTER N4 Model (tradename, Beckman Coulter, Inc.), as to a sample diluted with deionized water at 20° C.] and solid concentration of 30%. Thus obtained hydroxyl-containing acrylic resin had an acid value of 33 mgKOH/g and hydroxyl value of 25 mgKOH/g.

(Note 9) AQUALON KH-10: polyoxyethylene alkyl ether sulfate ester ammonium salt: Daiichi Kogyo Seiyaku Co., Ltd., active ingredient=97%

Monomeric emulsion (1): a monomeric emulsion obtained by mixing and stirring 42 parts of deionized water, 0.72 part of AQUALON KH-10, 2.1 part of methylenebisacrylamide, 2,8 parts of styrene, 16.1 parts of methyl methacrylate, 28 parts of ethyl acrylate and 21 parts of n-butyl acrylate Monomeric emulsion (2): a monomeric emulsion obtained by mixing and stirring 18 parts of deionized water, 0.31 part of AQUALON KH-10, 0.03 part of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate and 9 parts of n-butyl acrylate.

Production Examples 7-10

Repeating the operations of Production Example 6 except that the blends as shown in the following Table 2 were used, water-dispersible, hydroxyl-containing acrylic resins ($C_{1-2}$) to ($C_{1-5}$) were obtained.

Table 2 shows the starting composition (by parts), solid content (%), acid value (mgKOH/g) and hydroxyl value (mgKOH/g) of each of the water-dispersible, hydroxyl-containing acrylic resins (C1-1) to (C1-5).

TABLE 2

| | | Production Example | | | | |
|---|---|---|---|---|---|---|
| | | 6 | 7 | 8 | 9 | 10 |
| Hydroxyl-containing acrylic resin | | C1-1 | C1-2 | C1-3 | C1-4 | C1-5 |
| Deionized water | | 130 | 130 | 130 | 130 | 130 |
| AQUALON KH-10 | | 0.52 | 0.52 | 0.52 | 0.52 | 0.52 |
| 6% Aqueous ammonium persulfate | | 5.3 | 5.3 | 5.3 | 5.3 | 5.3 |
| Monomeric emulsion (1) | deionized water | 42 | 42 | 42 | 42 | 42 |
| | AQUALON KH-10 | 0.72 | 0.72 | 0.72 | 0.72 | 0.72 |
| | methylenebisacrylamide | 2.1 | 2.1 | | | |
| | allyl methacrylate | | | 2.1 | | 2.1 |
| | acrylamide | | | | 2.1 | |
| | styrene | 2.8 | 2.8 | 2.8 | 2.8 | 2.8 |
| | methyl methacrylate | 16.1 | 16.1 | 16.1 | 16.1 | 16.1 |
| | ethyl acrylate | 28 | 28 | 28 | 28 | 28 |
| | n-butyl acrylate | 21 | 21 | 21 | 21 | 21 |
| Monomeric emulsion (2) | deionized water | 18 | 18 | 18 | 18 | 18 |
| | AQUALON KH-10 | 0.31 | 0.31 | 0.31 | 0.31 | 0.31 |
| | ammonium persulfate | 0.03 | 0.03 | 0.03 | 0.03 | 0.03 |
| | styrene | 3 | | 3 | | |
| | 2-ethylhexyl acrylate | | 3 | | 3 | |
| | 2-hydroxyethyl acrylate | 5.1 | 5.1 | 5.1 | 5.1 | 5.1 |
| | methacrylic acid | 5.1 | 5.1 | 5.1 | 5.1 | 5.1 |
| | methyl methacrylate | 6 | 6 | 6 | 6 | 6 |
| | ethyl acrylate | 1.8 | 1.8 | 1.8 | 1.8 | 1.8 |
| | n-butyl acrylate | 9 | 9 | 9 | 9 | 9 |

TABLE 2-continued

|  | Production Example | | | | |
|---|---|---|---|---|---|
|  | 6 | 7 | 8 | 9 | 10 |
| 5% Aqueous 2-(dimethylamino)ethanol solution | 40 | 40 | 40 | 40 | 40 |
| Solid content (%) | 30 | 30 | 30 | 30 | 30 |
| Acid value (mgKOH/g) | 33 | 33 | 33 | 33 | 33 |
| Hydroxyl value (mgKOH/g) | 25 | 25 | 25 | 25 | 25 |

In Table 2, methylenebisacrylamide and allyl methacrylate in the monomeric emulsion (1) are polymerizable unsaturated monomers (c-2) having 2 polymerizable unsaturated groups per molecule. Of these, methylenebisacrylamide is a polymerizable unsaturated monomer (c-2') having at least 2 polymerizable unsaturated groups and at least 1 amido group per molecule. Also styrene and 2-ethylhexyl acrylate in the monomeric emulsion (2) are hydrophobic polymerizable unsaturated monomers (c-4).

In Table 2, among those water-dispersible, hydroxyl-containing acrylic resins (C1-1) through (C1-5), (C1-1) to (C1-3) correspond to core-shell type water-dispersible acrylic resin (C1').

Production of Hydroxyl-containing Polyester Resin (C2)

Production Example 11

A reactor equipped with a thermometer, thermostat, stirrer, reflux condenser and water-separator was charged with 109 parts of trimethylolpropane, 141 parts of 1,6-hexanediol, 126 parts of hexahydrophthalic anhydride and 120 parts of adipic acid, and the temperature therein was raised from 160° C. to 230° C. over 3 hours, followed by 4 hours' condensation reaction at 230° C. Then further 38.3 parts of trimellitic anhydride was added to the resulting condensation reaction product to add carboxyl groups thereto, reacted at 170° C. for 30 minutes and diluted with 2-ethyl-1-hexanol (whose soluble mass in 100 g of 20° C. water: 0.1 g) to provide a hydroxyl-containing polyester resin solution (C2-1) having a solid concentration of 70%. Thus obtained hydroxyl-containing polyester resin had an acid value of 46 mgKOH/g, hydroxyl value of 150 mgKOH/g and weight-average molecular weight of 6,400. In the starting composition, the total content of alicyclic polybasic acid in the acid component was 46 mol %, based on the total amount of the acid component.

Production Example 12

A reactor equipped with a thermometer, thermostat, stirrer, reflux condenser and water-separator was charged with 111 parts of trimethylolpropane, 143 parts of 1,6-hexanediol, 50 parts of hexahydrophthalic anhydride, 100 parts of isophthalic acid and 106 parts of adipic acid, and the temperature therein was raised from 160° C. to 230° C. over 3 hours, followed by 4 hours' condensation reaction at 230° C. Then further 38 parts of trimellitic anhydride was added to the resulting condensation reaction product to add carboxyl groups thereto, reacted at 170° C. for 30 minutes and diluted with 2-ethyl-1-hexanol (whose soluble mass in 100 g of 20° C. water: 0.1 g) to provide a hydroxyl-containing polyester resin solution ($C_{2-2}$) having a solid concentration of 70%. Thus obtained hydroxyl-containing polyester resin had an acid value of 46 mgKOH/g, hydroxyl value of 151 mgKOH/g and weight-average molecular weight of 6,100. In the starting composition, the total content of alicyclic polybasic acid in the acid component was 17 mol %, based on the total amount of the acid component.

Production Example 13

Production Example 11 was repeated except that the diluting solvent, 2-ethyl-1-hexanol, was replaced with ethylene glycol mono-n-butyl ether (whose soluble mass in 100 g of 20° C. water: unlimited), to provide a polyester resin solution (C2-3).

Production of Paint Composition

Example 20

In an agitation mixing vessel, 19 parts of aluminium pigment paste, GX-180A (tradename, Asahikasei Metals Co., Ltd., metal content 74%), 35 parts of 2-ethyl-1-hexanol (whose soluble mass in 100 g of 20° C. water: 0.1 g), 10 parts of the pigment-dispersing resin solution (A-1) as obtained in Example 1 and 0.2 part of 2-(dimethyl-amino)ethanol were homogeneously mixed to provide a pigment dispersion.

Then 100 parts of the acrylic resin emulsion (C1-1) as obtained in Production Example 6, 57 parts of the polyester resin solution (C2-1) as obtained in Production Example 11, 64 parts of above pigment dispersion and 37.5 parts of CYMEL 325 (tradename, Nippon Cytec Industries, Inc., melamine resin, solid content 80%) were homogeneously mixed. Further a polyacrylic acid thickener (PRIMAL ASE-60, tradename, Rohm & Haas Co.), 2-(dimethyl-amino)ethanol and deionized water were added to provide a water-based paint composition (X-1) having a pH 8.0; solid content 23% and the viscosity as measured with Ford cup No. 4 at 20° C. of 40 seconds.

Examples 21-45 and Comparative Examples 5-8

Example 20 was repeated except that the composition of each blend was changed to that as indicated in the following Table 3, to provide water-based paint compositions (X-2) through (X-26), and (X-28) through (X-31) having a pH 8.0, solid content 23% and viscosity of 40 seconds as measured with Ford cup No. 4 at 20° C.

Example 46

In an agitation mixing vessel, 19 parts of aluminium pigment paste, GX-180A (tradename, Asahikasei Metals Co., Ltd., metal content 74%), 35 parts of 2-ethyl-1-hexanol (whose soluble mass in 100 g of 20° C. water: 0.1 g), 10 parts of the pigment-dispersing resin solution (A-9) as obtained in Example 9 and 0.2 part of 2-(dimethyl-amino)ethanol were homogeneously mixed to provide a pigment dispersion.

Then 100 parts of the acrylic resin emulsion (C1-1) as obtained in Production Example 6, 57 parts of the polyester resin solution (C2-1) obtained in Production Example 11, 64 parts of above pigment dispersion and 37.5 parts of CYMEL 325 (tradename, Nippon Cytec Industries, Inc., melamine resin, solid content 80%) were homogeneously mixed. Further a urethane association type thickener (UH-752, tradename, ADEKA Corporation), 2-(dimethylamino)ethanol and deionized water were added to provide a water-based paint composition (X-27) having a pH 8.0; solid content 23% and the viscosity as measured with Ford cup No. 4 at 20° C. of 40 seconds.

TABLE 3

|  |  |  | Example | | | | | |
|---|---|---|---|---|---|---|---|---|
|  |  |  | 20 | 21 | 22 | 23 | 24 | 25 |
|  |  | Paint Composition | X1 | X2 | X3 | X4 | X5 | X6 |
| Pigment Dispersion | Pigment-dispersing resin (A) | Pigment-dispersing resin solution (A-1) | 10 | | | | | |
|  |  | Pigment-dispersing resin solution (A-2) | | 10 | | | | |
|  |  | Pigment-dispersing resin solution (A-3) | | | 10 | | | |
|  |  | Pigment-dispersing resin solution (A-4) | | | | 10 | | |
|  |  | Pigment-dispersing resin solution (A-5) | | | | | 10 | |
|  |  | Pigment-dispersing resin solution (A-6) | | | | | | 10 |
|  |  | Pigment-dispersing resin solution (A-7) | | | | | | |
|  |  | Pigment-dispersing resin solution (A-8) | | | | | | |
|  |  | Pigment-dispersing resin solution (A-9) | | | | | | |
|  |  | Pigment-dispersing resin solution (A-10) | | | | | | |
|  |  | Pigment-dispersing resin solution (A-11) | | | | | | |
|  |  | Pigment-dispersing resin solution (A-12) | | | | | | |
|  |  | Pigment-dispersing resin solution (A-13) | | | | | | |
|  |  | Pigment-dispersing resin solution (A-14) | | | | | | |
|  |  | Pigment-dispersing resin solution (A-15) | | | | | | |
|  |  | Pigment-dispersing resin solution (A-16) | | | | | | |
|  |  | Pigment-dispersing resin solution (A-17) | | | | | | |
|  |  | Pigment-dispersing resin solution (A-18) | | | | | | |
|  |  | Pigment-dispersing resin solution (A-19) | | | | | | |
|  |  | Pigment-dispersing resin solution (A-20) | | | | | | |
|  |  | Pigment-dispersing resin solution (A-21) | | | | | | |
|  |  | Pigment-dispersing resin solution (A-22) | | | | | | |
|  |  | Pigment-dispersing resin solution (A-23) | | | | | | |
|  | Pigment (B) | GX-180A | 19 | 19 | 19 | 19 | 19 | 19 |
|  | Hydrophobic solvent (E) | 2-ethyl-1-hexanol | 35 | 35 | 35 | 35 | 35 | 35 |
|  |  | ethylene glycol mono-n-butyl ether (note 10) | | | | | | |
|  |  | 2-(dimethylamino)ethanol | 0.2 | 0.2 | 0.2 | 0.2 | 0.2 | 0.2 |
| Hydroxyl-containing Resin (C) | Hydroxyl-containing acrylic resin (C1) | hydroxyl-containing acrylic resin dispersion liquid (C1-1) | 100 | 100 | 100 | 100 | 100 | 100 |
|  |  | hydroxyl-containing acrylic resin dispersion liquid (C1-2) | | | | | | |
|  |  | hydroxyl-containing acrylic resin dispersion liquid (C1-3) | | | | | | |
|  |  | hydroxyl-containing acrylic resin dispersion liquid (C1-4) | | | | | | |
|  |  | hydroxyl-containing acrylic resin dispersion liquid (C1-5) | | | | | | |
|  | Hydroxyl-containing polyester resin (C2) | hydroxyl-containing polyester resin dispersion liquid (C2-1) | 57 | 57 | 57 | 57 | 57 | 57 |
|  |  | hydroxyl-containing polyester resin dispersion liquid (C2-2) | | | | | | |
|  |  | hydroxyl-containing polyester resin dispersion liquid (C2-3) | | | | | | |
| Curing agent (D) | Melamine resin (D1) | CYMEL 325 | 37.5 | 37.5 | 37.5 | 37.5 | 37.5 | 37.5 |
|  | Blocked polyisocyanate compound (D3) | BYHYDUR VPLS2310 (note 11) | | | | | | |

|  |  |  | Example | | | | |
|---|---|---|---|---|---|---|---|
|  |  |  | 26 | 27 | 28 | 29 | 30 |
|  |  | Paint Composition | X7 | X8 | X9 | X10 | X11 |
| Pigment Dispersion | Pigment-dispersing resin (A) | Pigment-dispersing resin solution (A-1) | | | | | |
|  |  | Pigment-dispersing resin solution (A-2) | | | | | |
|  |  | Pigment-dispersing resin solution (A-3) | | | | | |
|  |  | Pigment-dispersing resin solution (A-4) | | | | | |
|  |  | Pigment-dispersing resin solution (A-5) | | | | | |
|  |  | Pigment-dispersing resin solution (A-6) | | | | | |
|  |  | Pigment-dispersing resin solution (A-7) | 10 | | | | |
|  |  | Pigment-dispersing resin solution (A-8) | | 10 | | | |
|  |  | Pigment-dispersing resin solution (A-9) | | | 10 | | |
|  |  | Pigment-dispersing resin solution (A-10) | | | | 10 | |
|  |  | Pigment-dispersing resin solution (A-11) | | | | | 10 |
|  |  | Pigment-dispersing resin solution (A-12) | | | | | |
|  |  | Pigment-dispersing resin solution (A-13) | | | | | |
|  |  | Pigment-dispersing resin solution (A-14) | | | | | |
|  |  | Pigment-dispersing resin solution (A-15) | | | | | |
|  |  | Pigment-dispersing resin solution (A-16) | | | | | |
|  |  | Pigment-dispersing resin solution (A-17) | | | | | |
|  |  | Pigment-dispersing resin solution (A-18) | | | | | |
|  |  | Pigment-dispersing resin solution (A-19) | | | | | |
|  |  | Pigment-dispersing resin solution (A-20) | | | | | |
|  |  | Pigment-dispersing resin solution (A-21) | | | | | |
|  |  | Pigment-dispersing resin solution (A-22) | | | | | |
|  |  | Pigment-dispersing resin solution (A-23) | | | | | |

TABLE 3-continued

|  |  |  | | | | | |
|---|---|---|---|---|---|---|---|
| | Pigment (B) | GX-180A | 19 | 19 | 19 | 19 | 19 |
| | Hydrophobic solvent (E) | 2-ethyl-1-hexanol | 35 | 35 | 35 | 35 | 35 |
| | | ethylene glycol mono-n-butyl ether (note 10) | | | | | |
| | | 2-(dimethylamino)ethanol | 0.2 | 0.2 | 0.2 | 0.2 | 0.2 |
| Hydroxyl-containing Resin (C) | Hydroxyl-containing acrylic resin (C1) | hydroxyl-containing acrylic resin dispersion liquid (C1-1) | 100 | 100 | 100 | 100 | 100 |
| | | hydroxyl-containing acrylic resin dispersion liquid (C1-2) | | | | | |
| | | hydroxyl-containing acrylic resin dispersion liquid (C1-3) | | | | | |
| | | hydroxyl-containing acrylic resin dispersion liquid (C1-4) | | | | | |
| | | hydroxyl-containing acrylic resin dispersion liquid (C1-5) | | | | | |
| | Hydroxyl-containing polyester resin (C2) | hydroxyl-containing polyester resin dispersion liquid (C2-1) | 57 | 57 | 57 | 57 | 57 |
| | | hydroxyl-containing polyester resin dispersion liquid (C2-2) | | | | | |
| | | hydroxyl-containing polyester resin dispersion liquid (C2-3) | | | | | |
| Curing agent (D) | Melamine resin (D1) | CYMEL 325 | 37.5 | 37.5 | 37.5 | 37.5 | 37.5 |
| | Blocked polyisocyanate compound (D3) | BYHYDUR VPLS2310 (note 11) | | | | | |

| | | | Example | | | | |
|---|---|---|---|---|---|---|---|
| | | | 31 | 32 | 33 | 34 | 35 |
| | Paint Composition | | X12 | X13 | X14 | X15 | X16 |
| Pigment Dispersion | Pigment-dispersing resin (A) | Pigment-dispersing resin solution (A-1) | | | | | |
| | | Pigment-dispersing resin solution (A-2) | | | | | |
| | | Pigment-dispersing resin solution (A-3) | | | | | |
| | | Pigment-dispersing resin solution (A-4) | | | | | |
| | | Pigment-dispersing resin solution (A-5) | | | | | |
| | | Pigment-dispersing resin solution (A-6) | | | | | |
| | | Pigment-dispersing resin solution (A-7) | | | | | |
| | | Pigment-dispersing resin solution (A-8) | | | | | |
| | | Pigment-dispersing resin solution (A-9) | | | | | |
| | | Pigment-dispersing resin solution (A-10) | | | | | |
| | | Pigment-dispersing resin solution (A-11) | | | | | |
| | | Pigment-dispersing resin solution (A-12) | 10 | | | | |
| | | Pigment-dispersing resin solution (A-13) | | 10 | | | |
| | | Pigment-dispersing resin solution (A-14) | | | 10 | | |
| | | Pigment-dispersing resin solution (A-15) | | | | 10 | |
| | | Pigment-dispersing resin solution (A-16) | | | | | 10 |
| | | Pigment-dispersing resin solution (A-17) | | | | | |
| | | Pigment-dispersing resin solution (A-18) | | | | | |
| | | Pigment-dispersing resin solution (A-19) | | | | | |
| | | Pigment-dispersing resin solution (A-20) | | | | | |
| | | Pigment-dispersing resin solution (A-21) | | | | | |
| | | Pigment-dispersing resin solution (A-22) | | | | | |
| | | Pigment-dispersing resin solution (A-23) | | | | | |
| | Pigment (B) | GX-180A | 19 | 19 | 19 | 19 | 19 |
| | Hydrophobic solvent (E) | 2-ethyl-1-hexanol | 35 | 35 | 35 | 35 | 35 |
| | | ethylene glycol mono-n-butyl ether (note 10) | | | | | |
| | | 2- (dimethylamino)ethanol | 0.2 | 0.2 | 0.2 | 0.2 | 0.2 |
| Hydroxyl-containing Resin (C) | Hydroxyl-containing acrylic resin (C1) | hydroxyl-containing acrylic resin dispersion liquid (C1-1) | 100 | 100 | 100 | 100 | 100 |
| | | hydroxyl-containing acrylic resin dispersion liquid (C1-2) | | | | | |
| | | hydroxyl-containing acrylic resin dispersion liquid (C1-3) | | | | | |
| | | hydroxyl-containing acrylic resin dispersion liquid (C1-4) | | | | | |
| | | hydroxyl-containing acrylic resin dispersion liquid (C1-5) | | | | | |
| | Hydroxyl-containing polyester resin (C2) | hydroxyl-containing polyester resin dispersion liquid (C2-1) | 57 | 57 | 57 | 57 | 57 |
| | | hydroxyl-containing polyester resin dispersion liquid (C2-2) | | | | | |
| | | hydroxyl-containing polyester resin dispersion liquid (C2-3) | | | | | |
| Curing agent (D) | Melamine resin (D1) | CYMEL 325 | 37.5 | 37.5 | 37.5 | 37.5 | 37.5 |
| | Blocked polyisocyanate compound (D3) | BYHYDUR VPLS2310 (note 11) | | | | | |

| | | | Example | | | | |
|---|---|---|---|---|---|---|---|
| | | | 36 | 37 | 38 | 39 | 40 |
| | Paint Composition | | X17 | X18 | X19 | X20 | X21 |
| Pigment Dispersion | Pigment-dispersing resin (A) | Pigment-dispersing resin solution (A-1) | | | | | |
| | | Pigment-dispersing resin solution (A-2) | | | | | |
| | | Pigment-dispersing resin solution (A-3) | | | | | |
| | | Pigment-dispersing resin solution (A-4) | | | | | |
| | | Pigment-dispersing resin solution (A-5) | | | | | |
| | | Pigment-dispersing resin solution (A-6) | | | | | |
| | | Pigment-dispersing resin solution (A-7) | | | | | |
| | | Pigment-dispersing resin solution (A-8) | | | | | 10 | 10 |
| | | Pigment-dispersing resin solution (A-9) | | | | | |
| | | Pigment-dispersing resin solution (A-10) | | | | | |
| | | Pigment-dispersing resin solution (A-11) | | | | | |
| | | Pigment-dispersing resin solution (A-12) | | | | | |
| | | Pigment-dispersing resin solution (A-13) | | | | | |
| | | Pigment-dispersing resin solution (A-14) | | | | | |
| | | Pigment-dispersing resin solution (A-15) | | | | | |

TABLE 3-continued

| | | | | | | | | |
|---|---|---|---|---|---|---|---|---|
| | | Pigment-dispersing resin solution (A-16) | | | | | | |
| | | Pigment-dispersing resin solution (A-17) | 10 | | | | | |
| | | Pigment-dispersing resin solution (A-18) | | 10 | | | | |
| | | Pigment-dispersing resin solution (A-19) | | | 10 | | | |
| | | Pigment-dispersing resin solution (A-20) | | | | | | |
| | | Pigment-dispersing resin solution (A-21) | | | | | | |
| | | Pigment-dispersing resin solution (A-22) | | | | | | |
| | | Pigment-dispersing resin solution (A-23) | | | | | | |
| | Pigment (B) | GX-180A | 19 | 19 | 19 | 19 | 19 | |
| | Hydrophobic solvent (E) | 2-ethyl-1-hexanol | 35 | 35 | 35 | 35 | 35 | |
| | | ethylene glycol mono-n-butyl ether (note 10) | | | | | | |
| | | 2-(dimethylamino)ethanol | 0.2 | 0.2 | 0.2 | 0.2 | 0.2 | |
| Hydroxyl-containing Resin (C) | Hydroxyl-containing acrylic resin (C1) | hydroxyl-containing acrylic resin dispersion liquid (C1-1) | 100 | 100 | 100 | | | |
| | | hydroxyl-containing acrylic resin dispersion liquid (C1-2) | | | | 100 | | |
| | | hydroxyl-containing acrylic resin dispersion liquid (C1-3) | | | | | 100 | |
| | | hydroxyl-containing acrylic resin dispersion liquid (C1-4) | | | | | | |
| | | hydroxyl-containing acrylic resin dispersion liquid (C1-5) | | | | | | |
| | Hydroxyl-containing polyester resin (C2) | hydroxyl-containing polyester resin dispersion liquid (C2-1) | 57 | 57 | 57 | 57 | 57 | |
| | | hydroxyl-containing polyester resin dispersion liquid (C2-2) | | | | | | |
| | | hydroxyl-containing polyester resin dispersion liquid (C2-3) | | | | | | |
| Curing agent (D) | Melamine resin (D1) | CYMEL 325 | 37.5 | 37.5 | 37.5 | 37.5 | 37.5 | |
| | Blocked polyisocyanate compound (D3) | BYHYDUR VPLS2310 (note 11) | | | | | | |

| | | | Example | | | | | |
|---|---|---|---|---|---|---|---|---|
| | | | 41 | 42 | 43 | 44 | 45 | 46 |
| | | Paint Composition | X22 | X23 | X24 | X25 | X26 | X27 |
| Pigment Dispersion | Pigment-dispersing resin (A) | Pigment-dispersing resin solution (A-1) | | | | | | |
| | | Pigment-dispersing resin solution (A-2) | | | | | | |
| | | Pigment-dispersing resin solution (A-3) | | | | | | |
| | | Pigment-dispersing resin solution (A-4) | | | | | | |
| | | Pigment-dispersing resin solution (A-5) | | | | | | |
| | | Pigment-dispersing resin solution (A-6) | | | | | | |
| | | Pigment-dispersing resin solution (A-7) | | | | | | |
| | | Pigment-dispersing resin solution (A-8) | 10 | 10 | | | | |
| | | Pigment-dispersing resin solution (A-9) | | | 10 | 10 | 10 | 10 |
| | | Pigment-dispersing resin solution (A-10) | | | | | | |
| | | Pigment-dispersing resin solution (A-11) | | | | | | |
| | | Pigment-dispersing resin solution (A-12) | | | | | | |
| | | Pigment-dispersing resin solution (A-13) | | | | | | |
| | | Pigment-dispersing resin solution (A-14) | | | | | | |
| | | Pigment-dispersing resin solution (A-15) | | | | | | |
| | | Pigment-dispersing resin solution (A-16) | | | | | | |
| | | Pigment-dispersing resin solution (A-17) | | | | | | |
| | | Pigment-dispersing resin solution (A-18) | | | | | | |
| | | Pigment-dispersing resin solution (A-19) | | | | | | |
| | | Pigment-dispersing resin solution (A-20) | | | | | | |
| | | Pigment-dispersing resin solution (A-21) | | | | | | |
| | | Pigment-dispersing resin solution (A-22) | | | | | | |
| | | Pigment-dispersing resin solution (A-23) | | | | | | |
| | Pigment (B) | GX-180A | 19 | 19 | 19 | 19 | 19 | 19 |
| | Hydrophobic solvent (E) | 2-ethyl-1-hexanol | 35 | 35 | 35 | | 35 | 35 |
| | | ethylene glycol mono-n-butyl ether (note 10) | | | | 35 | | |
| | | 2-(dimethylamino)ethanol | 0.2 | 0.2 | 0.2 | 0.2 | 0.2 | 0.2 |
| Hydroxyl-containing Resin (C) | Hydroxyl-containing acrylic resin (C1) | hydroxyl-containing acrylic resin dispersion liquid (C1-1) | | | 100 | 100 | 100 | 100 |
| | | hydroxyl-containing acrylic resin dispersion liquid (C1-2) | | | | | | |
| | | hydroxyl-containing acrylic resin dispersion liquid (C1-3) | | | | | | |
| | | hydroxyl-containing acrylic resin dispersion liquid (C1-4) | 100 | | | | | |
| | | hydroxyl-containing acrylic resin dispersion liquid (C1-5) | | 100 | | | | |
| | Hydroxyl-containing polyester resin (C2) | hydroxyl-containing polyester resin dispersion liquid (C2-1) | 57 | 57 | | | 57 | 57 |
| | | hydroxyl-containing polyester resin dispersion liquid (C2-2) | | | 57 | | | |
| | | hydroxyl-containing polyester resin dispersion liquid (C2-3) | | | | 57 | | |
| Curing agent (D) | Melamine resin (D1) | CYMEL 325 | 37.5 | 37.5 | 37.5 | 37.5 | 30 | 37.5 |
| | Blocked polyisocyanate compound (D3) | BYHYDUR VPLS2310 (note 11) | | | | | 15 | |

| | | | Comparative Example | | | |
|---|---|---|---|---|---|---|
| | | | 5 | 6 | 7 | 8 |
| | | Paint Composition | X28 | X29 | X30 | X31 |
| Pigment Dispersion | Pigment-dispersing resin (A) | Pigment-dispersing resin solution (A-1) | | | | |
| | | Pigment-dispersing resin solution (A-2) | | | | |
| | | Pigment-dispersing resin solution (A-3) | | | | |
| | | Pigment-dispersing resin solution (A-4) | | | | |
| | | Pigment-dispersing resin solution (A-5) | | | | |
| | | Pigment-dispersing resin solution (A-6) | | | | |
| | | Pigment-dispersing resin solution (A-7) | | | | |

TABLE 3-continued

| | | | | | | |
|---|---|---|---|---|---|---|
| | | Pigment-dispersing resin solution (A-8) | | | | |
| | | Pigment-dispersing resin solution (A-9) | | | | |
| | | Pigment-dispersing resin solution (A-10) | | | | |
| | | Pigment-dispersing resin solution (A-11) | | | | |
| | | Pigment-dispersing resin solution (A-12) | | | | |
| | | Pigment-dispersing resin solution (A-13) | | | | |
| | | Pigment-dispersing resin solution (A-14) | | | | |
| | | Pigment-dispersing resin solution (A-15) | | | | |
| | | Pigment-dispersing resin solution (A-16) | | | | |
| | | Pigment-dispersing resin solution (A-17) | | | | |
| | | Pigment-dispersing resin solution (A-18) | | | | |
| | | Pigment-dispersing resin solution (A-19) | | | | |
| | | Pigment-dispersing resin solution (A-20) | 10 | | | |
| | | Pigment-dispersing resin solution (A-21) | | 10 | | |
| | | Pigment-dispersing resin solution (A-22) | | | 10 | |
| | | Pigment-dispersing resin solution (A-23) | | | | 10 |
| | Pigment (B) | GX-180A | 19 | 19 | 19 | 19 |
| | Hydrophobic solvent (E) | 2-ethyl-1-hexanol | 35 | 35 | 35 | 35 |
| | | ethylene glycol mono-n-butyl ether (note 10) | | | | |
| | | 2-(dimethylamino)ethanol | 0.2 | 0.2 | 0.2 | 0.2 |
| Hydroxyl-containing Resin (C) | Hydroxyl-containing acrylic resin (C1) | hydroxyl-containing acrylic resin dispersion liquid (C1-1) | 100 | 100 | 100 | 100 |
| | | hydroxyl-containing acrylic resin dispersion liquid (C1-2) | | | | |
| | | hydroxyl-containing acrylic resin dispersion liquid (C1-3) | | | | |
| | | hydroxyl-containing acrylic resin dispersion liquid (C1-4) | | | | |
| | | hydroxyl-containing acrylic resin dispersion liquid (C1-5) | | | | |
| | Hydroxyl-containing polyester resin (C2) | hydroxyl-containing polyester resin dispersion liquid (C2-1) | 57 | 57 | 57 | 57 |
| | | hydroxyl-containing polyester resin dispersion liquid (C2-2) | | | | |
| | | hydroxyl-containing polyester resin dispersion liquid (C2-3) | | | | |
| Curing agent (D) | Melamine resin (D1) | CYMEL 325 | 37.5 | 37.5 | 37.5 | 37.5 |
| | Blocked polyisocyanate compound (D3) | BYHYDUR VPLS2310 (note 11) | | | | |

(note 10) ethylene glycol mono-n-butyl ether: its mass soluble in 100 g of 20° C. water is unlimited,
(note 11) BYHYDUR VPLS2310: tradename, Sumika Bayer Urethane Co., Ltd., a blocked polyisocyanate compound; solid content 38%.

Coating Film-forming Method (Preparation of Test Panels)

Test panels of the respective water-based paint compositions (X-1)-(X-31) as obtained in above Examples 20-46 and Comparative Examples 5-8 were prepared as follows, which were subjected to the following evaluation tests.

(Preparation of Coated Objects for the Tests)

A zinc phosphate-treated cold-rolled steel sheet was electrocoated with ELECRON GT-10 (tradename, Kansai Paint Co., a thermosetting epoxy resin-containing cationic electrocoating paint) to a dry film thickness of 20 μm, which was cured by heating at 170° C. for 30 minutes. Onto the electrocoated film, an intermediate paint, TP-65-2 (tradename, Kansai Paint Co., a polyester resin-amino resin organic solvent-based intermediate paint) was applied to a dry film thickness of 35 μm, and cured by heating at 140° C. for 30 minutes, to provide the sample coating object.

Example 47

Onto the above coating object, the water-based paint composition (X-1) as obtained in Example 1 was applied with a rotary atomizing type bell-formed electrostatic coater to a dry film thickness of 15 μm, allowed to stand for 2 minutes and then preheated at 80° C. for 3 minutes. Then onto the uncured coated surface, MAGICRON KINO-1210 (tradename, Kansai Paint Co., an acrylic resin-containing, organic solvent-based top clear paint) was applied to a dry film thickness of 35 μm and allowed to stand for 7 minutes, followed by heating at 140° C. for 30 minutes to cure the two coating films simultaneously to provide a test panel.

Examples 48-73 and Comparative Examples 9-12

Example 47 was repeated except that the water-based paint composition (X-1) in Example 47 was replaced with those shown in the following Table 4, to provide the test panels of Examples 48-73 and Comparative Examples 9-12.

Evaluation Test

The test panels as obtained in above Examples 47-73 and Comparative Examples 9-12 were evaluated by the following test methods. The results of the evaluation were as shown in the following Table 4.

(Test Method)

Interlayer adherability: The multilayer coating film on each test panel was crosscut with a cutter to the depth reaching the substrate, to form one-hundred 2 mm×2 mm squares. Then an adhesive cellophane tape was stuck thereon, and rapidly peeled off at 20° C. Then remaining condition of the crosscut coating film was examined and evaluated according to the following standard.

◉: One-hundred squares of the coating film remained, and no minor chipping off in the coating film at the cut-in edges with the cutter was caused.

O: One-hundred squares of the coating film remained but minor chipping off in the coating film at the cut-in edges with the cutter was observed.

Δ: Remaining number of the squares was 90-99.

x: Remaining number of the square was not more than 89.

Water resistance: The test panels were immersed in 40° C. warm water for 240 hours, withdrawn, dried at room temperature for 12 hours, and given a test similar to the above interlayer adherability test. The evaluation standard also was identical.

Appearance: Coated surface of each test panel was given colorimetry with a multi-angle spectrophotometer, MA-68II (tradename, X-Rite Co.) to be measured of respective L* values at angles 15° and 110° from the regular reflection light of the light entered at an incident angle of 45°. From the L* value at the light receiving angle of 15° and that at the light receiving angle of 110°, flip-flop value of the coating film was determined according to the following equation:

Flip-flop value=L* value at light receiving angle of 15°/L* value at light receiving angle of 110°.

The greater the flip-flop value, the greater the variation in L* values (value) according to the observation angle (light receiving angle), and the better the coating film appearance.

TABLE 4

|  |  | Point Composition | Result of Evaluation | | |
|---|---|---|---|---|---|
|  |  |  | Interlayer adherability | Water resistance | Appearance |
| Example | 47 | X-1 | ○ | ○ | 4.2 |
|  | 48 | X-2 | ◉ | ◉ | 4.2 |
|  | 49 | X-3 | ◉ | ◉ | 4.2 |
|  | 50 | X-4 | ◉ | ◉ | 4.2 |
|  | 51 | X-5 | ◉ | ○ | 4.1 |
|  | 52 | X-6 | ◉ | ◉ | 4.3 |
|  | 53 | X-7 | ○ | ○ | 4.0 |
|  | 54 | X-8 | ◉ | ◉ | 4.4 |
|  | 55 | X-9 | ◉ | ◉ | 4.4 |
|  | 56 | X-10 | ◉ | ◉ | 4.3 |
|  | 57 | X-11 | ◉ | ○ | 4.3 |
|  | 58 | X-12 | ◉ | ○ | 4.2 |
|  | 59 | X-13 | ○ | ○ | 4.0 |
|  | 60 | X-14 | ◉ | ◉ | 4.2 |
|  | 61 | X-15 | ◉ | ◉ | 4.2 |
|  | 62 | X-16 | ◉ | ○ | 4.2 |
|  | 63 | X-17 | ◉ | ○ | 4.3 |
|  | 64 | X-18 | ◉ | ○ | 4.3 |
|  | 65 | X-19 | ○ | ○ | 4.3 |
|  | 66 | X-20 | ◉ | ◉ | 4.3 |
|  | 67 | X-21 | ◉ | ◉ | 4.2 |
|  | 68 | X-22 | ◉ | ○ | 4.1 |
|  | 69 | X-23 | ◉ | ○ | 4.1 |
|  | 70 | X-24 | ◉ | ◉ | 4.3 |
|  | 71 | X-25 | ◉ | ◉ | 4.2 |
|  | 72 | X-26 | ◉ | ◉ | 4.4 |
|  | 73 | X-27 | ◉ | ◉ | 4.5 |
| Comparative | 9 | X-28 | ○ | X | 3.3 |
| Example | 10 | X-29 | ○ | X | 3.2 |
|  | 11 | X-30 | ○ | Δ | 3.5 |
|  | 12 | X-31 | ○ | X | 3.4 |

The invention claimed is:

1. A method for producing a pigment-dispersing resin (A) containing divalent group(s) represented by the following formula (I):

(wherein $R_1$ is a $C_{1\text{-}10}$ alkylene group, m is an integer of 1-30, and the m recurring units,

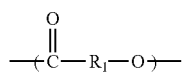

may be the same or different, phosphoric acid group(s) and/or sulfonic acid group(s), comprising:

copolymerizing a polymerizable unsaturated monomeric mixture (a-3): a mixture of polymerizable unsaturated monomer(s) (m-6) having the divalent group represented by the above formula (I) and phosphoric acid group, and polymerizable unsaturated monomer(s) (m-7) other than the polymerizable unsaturated monomer(s) (m-6), wherein the polymerizable unsaturated monomeric mixture (a-3) is composed of 1-90 mass % of the polymerizable unsaturated monomer(s) (m-6), and 10-99 mass % of the polymerizable unsaturated monomer(s) (m-7), based on a total amount of the polymerizable unsaturated monomers (m-6) and (m-7);

in a reaction solvent (b) which comprises at least 30 mass %, based on a total mass of the reaction solvent, of an organic solvent (b-1) having no hydroxyl group and having a solubility in 20° C. water of at least 100 mass %.

2. The method according to claim 1, in which the organic solvent (b-1) is selected from the group consisting of ether solvents, amide solvents and urea solvents.

3. The method according to claim 2, in which the reaction solvent (b) contains 50-100 mass %, based on the total mass of the reaction solvent (b), of the organic solvent (b-1).

4. The method according to claim 1, in which the monomeric mixture is copolymerized by solution polymerization method.

5. The method according to claim 1, in which the pigment-dispersing resin (A) contains the divalent group(s) represented by the formula (I) within a range of 1-70 mass %, based on a mass of the pigment-dispersing resin (A).

6. The method according to claim 1, in which the pigment-dispersing resin (A) has an acid value within a range of 30-200 mgKOH/g.

7. A pigment-dispersing resin (A) which is prepared by the method according to claim 1.

8. A pigment dispersion comprising a pigment-dispersing resin (A) which is prepared by the method according to claim 1 and pigment (B).

9. A water-based paint composition comprising the pigment dispersion according to claim 8, hydroxyl-containing resin (C) and curing agent (D).

10. The water-based paint composition according to claim 9, which comprises, per 100 mass parts of a combined solid resin content of the hydroxyl-containing resin (C) and curing agent (D), 0.5-30 mass parts of the pigment-dispersing resin (A), 2-70 mass parts of pigment (B), 40-90 mass parts of hydroxyl-containing resin (C) and 10-60 mass parts of curing agent (D).

11. An article coated with the water-based paint composition according to claim 9.

12. A multilayer coating film-forming method which comprises applying onto a coating object the water-based paint composition according to claim 9, applying onto the resulting uncured coating film a clear paint, and heating to cure the two coating films simultaneously.

13. An article coated by the multilayer coating film-forming method according to claim 12.

* * * * *